US010819247B2

(12) United States Patent
Otake et al.

(10) Patent No.: US 10,819,247 B2
(45) Date of Patent: Oct. 27, 2020

(54) DIRECT-CURRENT POWER SUPPLY DEVICE WITH PRIMARY AND SECONDARY MAGNETIC CORES

(71) Applicant: ROHM CO., LTD., Kyoto-shi, Kyoto (JP)

(72) Inventors: Hirotaka Otake, Kyoto (JP); Mamoru Tsuruya, Saitama (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/475,607

(22) PCT Filed: Feb. 5, 2018

(86) PCT No.: PCT/JP2018/003787
§ 371 (c)(1),
(2) Date: Jul. 2, 2019

(87) PCT Pub. No.: WO2018/147221
PCT Pub. Date: Aug. 16, 2018

(65) Prior Publication Data
US 2019/0326826 A1    Oct. 24, 2019

(30) Foreign Application Priority Data
Feb. 7, 2017 (JP) ................................. 2017-020566

(51) Int. Cl.
*H02M 3/335* (2006.01)
(52) U.S. Cl.
CPC ............................. *H02M 3/33592* (2013.01)
(58) Field of Classification Search
CPC .......................... H02M 3/33592; H02M 3/335
See application file for complete search history.

(56) References Cited

U.S. PATENT DOCUMENTS 5,105,351 A    4/1992   Harada et al.
5,272,612 A    12/1993   Harada et al.
(Continued)

FOREIGN PATENT DOCUMENTS

JP     2-009109     1/1990
JP     4-229599     8/1992
(Continued)

OTHER PUBLICATIONS

International Search Report issued in International Application No. PCT/JP2018/003787, dated Apr. 10, 2018, 5 pages.

*Primary Examiner* — Jue Zhang
*Assistant Examiner* — Trinh Q Dang
(74) *Attorney, Agent, or Firm* — Hamre, Schumann, Mueller & Larson, P.C.

(57) ABSTRACT

This DC power supply device comprises: a transformer having a primary magnetic core, a secondary magnetic core, at least one primary coil wound on the primary magnetic core, and a plurality of secondary coils wound on the secondary magnetic core; and at least one bridge composed of transistors. The DC power supply device has: a primary circuit connected to the primary coil; and a plurality of secondary circuits respectively connected to the plurality of secondary coils and each having a first secondary resonance capacitor, a second secondary resonance capacitor, and a smoothing circuit. The primary circuit and the plurality of secondary circuits are electrically insulated from each other by the transformer. In the plurality of secondary circuits, output parts of respective smoothing circuits are serially connected to each other. The primary magnetic core and the secondary magnetic core are disposed to face each other with an insulator disposed therebetween.

16 Claims, 23 Drawing Sheets

(56) References Cited

U.S. PATENT DOCUMENTS

| | | | |
|---|---|---|---|
| 2001/0008552 A1 | 7/2001 | Harada et al. | |
| 2006/0227576 A1 | 10/2006 | Yasumura | |
| 2011/0187458 A1* | 8/2011 | Kim | H03F 1/22 330/295 |
| 2014/0361633 A1* | 12/2014 | Abe | H01F 38/14 307/104 |
| 2016/0111202 A1* | 4/2016 | Chen | H01F 27/29 336/182 |
| 2017/0025963 A1 | 1/2017 | Otake et al. | |

FOREIGN PATENT DOCUMENTS

| | | |
|---|---|---|
| JP | 5-205953 | 8/1993 |
| JP | 8-019258 | 1/1996 |
| JP | 10-112398 | 4/1998 |
| JP | 2001-269330 | 10/2001 |
| JP | 2002-186257 | 6/2002 |
| JP | 3827335 B | 9/2006 |
| JP | 2006-304391 | 11/2006 |
| JP | 2013-223328 | 10/2013 |
| JP | 2016-001980 | 1/2016 |
| JP | 2016-097185 | 5/2016 |

* cited by examiner

DIRECTION IN WHICH CORES FACE EACH OTHER

DIRECT-CURRENT POWER SUPPLY DEVICE WITH PRIMARY AND SECONDARY MAGNETIC CORES

TECHNICAL FIELD

The invention disclosed herein relates to a direct-current power supply device.

BACKGROUND ART

Direct-current power supply devices which can output a high voltage (a several kV to several hundred kV output) are used as a power supply for different applications such as particle accelerators used for research, cancer treatment, and the like, x-ray generating devices used for an X-ray examination and the like, plasma generators used for semiconductor manufacturing, thin film coating, and the like, and static eliminating devices.

As a power supply for particle accelerators, x-ray generating devices, and the like among the above-mentioned applications, direct-current high-voltage power supply devices (see, for example, the two-stage CW circuit in FIG. 23) using a Cockcroft-Walton circuit system (CW circuit system) are widely used.

This CW circuit system has a configuration in which voltage amplifying circuits each composed of a capacitor and a diode are stacked in a shape of a ladder and has an advantage that significant voltage boosting is possible with a simple and inexpensive circuit. Also, by combining voltage boosting by an inverter and that by a transformer, while isolating an output side from an input side, an even higher voltage can be obtained.

List of Citations

PATENT LITERATURE

Patent Document 1: JP-A-H10-112398
Patent Document 2: JP-A-H8-19258
Patent Document 3: JP-A-H4-229599
Patent Document 4: JP-A-2016-97185
Patent Document 5: Japanese Patent No. 3827335 Specification
Patent Document 6: JP-A-2001-269330

Non-Patent Literature

SUMMARY OF THE INVENTION

Problem to be Solved by the Invention

However, the CW circuit system has a problem (the first problem) that, when a high voltage is output, a sufficient insulation withstand voltage needs to be secured in each stage of boosting transformers and voltage amplifying circuits. In addition, the CW circuit system has a problem (the second problem) that their output voltage tends to fluctuate or pulsate and that a high output current sufficient for high power cannot be obtained even when the output voltage is lowered because the output is obtained from the discharge current from the capacitor.

As one example of the measures against the first problem, there is a known technique (such as Patent Document 1 or 2) for securing insulation by immersing a target part in an oil tank or sealing it in molding. Another possible measure is to prevent the discharge by sealing the target part in a gas such as $SF_6$.

However, such a configuration requires use of oil of which the withstand voltage degrades with soiling, or use of a greenhouse effect gas, or complete filling with resin of a high voltage part having a complicated structure using a thermoplastic resin.

Furthermore, the above measures alone cannot solve the second problem, and thus it is not possible to meet requirements in applications where even higher power is needed.

On the other hand, a system that uses no CW circuit which may cause the second problem uses techniques (such as the ones in Patent Documents 3 and 4) for obtaining high voltage output, in which a plurality of step-up DC-DC converters and the like which boost a voltage according to the winding ratio of an insulated transformer are used and the output parts of the respective secondary voltage doubler smoothing circuits are connected in series with each other.

With this structure, the output current is not limited by the CW circuit, and thus it is comparatively easy to achieve high power. However, if isolation is secured by the above-mentioned sealing technique, the various problems described previously are left unsolved.

On the other hand, although the main purpose is to supply electric power to a movable part and applications are limited, there are precedents (such as the ones in Patent Documents 5 or 6) in which the primary and secondary sides of a transformer or a coil are physically isolated from each other. In those configurations, a required insulation withstand voltage is secured without using special insulation systems. Moreover, they are so devised, by inserting a capacitor in series with a leakage inductance of a transformer and operating an inverter part at around the resonance frequency, as to prevent the influence of the two trade-off factors, that is, a decrease in the coupling ratio and an increase in the leakage inductance, thereby to increase the output gain.

In such a configuration, however, as voltage increases and required insulation withstand voltage increases accordingly, for example, the distance between transformers need to be increased. This lowers the coupling ratio and makes it difficult to obtain the desired output gain.

Also, in a configuration where primary and secondary circuits are coupled one-to-one with each other, as voltage increases, a diode or a capacitor with a higher withstand voltage is required in the smoothing circuit on the secondary side, and this leads to an increase in the size and cost of the circuit. Incidentally, increasing the number of series stages on the secondary circuit to lower the output voltage of each stage eliminates the need to unnecessarily increase the withstand voltage of the smoothing circuit. By such a measure, however, as the number of stages in the secondary circuit increases, also the number of series stages in the primary circuit needs to be increased, and this leads to an increase in the size and cost of the circuit.

An object of the invention disclosed herein is, in view of the problems found by the present inventors, to provide a direct-current power supply device which can achieve both easy and stable isolation and a high output gain.

Means for Solving the Problem

According to one aspect of what is disclosed herein, a direct-current power supply device includes: a transformer including a primary magnetic core, a secondary magnetic core, at least one primary winding wound around the primary magnetic core, and a plurality of secondary windings wound around the secondary magnetic core; a primary circuit including at least one bridge composed of a transistor, the primary circuit being connected to the primary winding; and a plurality of secondary circuits each including a first secondary resonance capacitor, a second secondary resonance capacitor, and a smoothing circuit, the plurality of secondary circuits being connected to the plurality of secondary windings respectively. Moreover, the transformer electrically isolates the primary circuit from the plurality of secondary circuits, and the plurality of secondary circuits have output parts of their respective smoothing circuits connected in series with each other, and the primary and secondary magnetic cores are arranged so as to face each other via an insulator. (The first configuration.)

According to another aspect of the present invention, a direct-current power supply device includes: a transformer including a primary magnetic core, a secondary magnetic core, at least one primary winding wound around the primary magnetic core, a plurality of secondary windings wound around the secondary magnetic core, and at least one additional winding wound around the secondary magnetic core; a primary circuit including at least one bridge composed of a transistor, the primary circuit being connected to the primary winding; a plurality of secondary circuits each including a first secondary resonance capacitor and a smoothing circuit, the plurality of secondary circuits being connected to the plurality of secondary windings respectively; and an additional circuit including a second secondary resonance capacitor and connected to the additional winding. Moreover, the transformer electrically isolates the primary circuit from the plurality of secondary circuits and the additional circuit, the plurality of secondary circuits have output parts of their respective smoothing circuits connected in series with each other, and the primary and secondary magnetic cores are arranged so as to face each other via an insulator. (The second configuration.)

According to another aspect of the present invention, preferably, in the direct-current power supply device according to the second configuration, the additional winding is arranged between adjacent stages of the plurality of secondary windings of which outputs are directly connected to each other in a circuit or adjacent to a topmost or bottommost stage of the plurality of secondary windings. (The third configuration.)

According to another aspect of the present invention, preferably, in the direct-current power supply device according to either of the second or third configuration, a plurality of sets of the transformer, the plurality of secondary circuits, and the additional circuit are provided, the primary windings in all the sets are connected each in parallel with the primary circuit, which is common to all the sets, the additional windings in all the sets are connected in parallel with each other, and the plurality of secondary circuits have output parts of their respective smoothing circuits connected in series across all the sets. (The fourth configuration.)

According to another aspect of the present invention, preferably, in the direct-current power supply device according to the fourth configuration, the second secondary resonance capacitor is shared by the additional circuits in the plurality of sets. (The fifth configuration.)

According to another aspect of the present invention, preferably, in the direct-current power supply device according to any one of the first to fifth configurations, the primary circuit further includes a primary resonance capacitor. (The sixth configuration.)

According to another aspect of the present invention, preferably, in the direct-current power supply device according to any one of the first to sixth configurations, the transistor is an SiC-based MISFET (metal-insulator-semiconductor field-effect transistor). (The seventh configuration.)

According to another aspect of the present invention, preferably, in the direct-current power supply device according to any one of the first to seventh configurations, the primary and secondary magnetic cores each have a selectively larger cross-sectional area in its part close to the insulator. (The eighth configuration.)

According to another aspect of the present invention, preferably, in the direct-current power supply device according to the eighth configuration, the primary and secondary magnetic cores are each composed of a combination of a first member, around which the primary and secondary windings are wound respectively, and a second member, which has a larger cross-sectional area than the first member, and the second member is arranged so as to face the insulator. (The ninth configuration.)

According to another aspect of the present invention, preferably, in the direct-current power supply device according to any one of the first to ninth configurations, the insulator is a plate-like member arranged perpendicular to a direction in which the primary and secondary magnetic cores face each other, the insulator being thick enough not to undergo insulation breakdown and having a larger area than a cross-sectional area of the cores. (The tenth configuration.)

According to another aspect of the present invention, preferably, in the direct-current power supply device according to any one of the first to tenth configurations, the plurality of secondary windings are spatially separated from each other by a bobbin and every two secondary windings of which the outputs are directly connected to each other in the circuit are arranged next to each other. (The eleventh configuration.)

According to another aspect of the present invention, preferably, in the direct-current power supply device according to any one of the first to eleventh configurations, positions of the primary and secondary magnetic cores relative to each other are fixed by a bobbin. (The twelfth configuration.)

According to another aspect of the present invention, preferably, in the direct-current power supply device according to any one of the first to twelfth configurations, an operating frequency of the transistor constituting the bridge is set at close to a frequency of an output gain peak determined by the first secondary resonance capacitor, the second secondary resonance capacitor, and the transformer. (The thirteenth configuration.)

According to another aspect of the present invention, preferably, in the direct-current power supply device according to any one of the first to thirteenth configurations, the primary circuit includes first and second bridges as the bridge, the primary winding is connected between respective output terminals of the first and second bridges, and an operating frequency and an operation phase difference of the transistor constituting each bridge can be controlled individually or in a coordinated manner. (The fourteenth configuration.)

According to another aspect of the present invention, a direct-current power supply device includes a plurality of the direct-current power supply devices according to any one of the first to fourteenth configurations described above, wherein the direct-current power supply devices have their respective output parts connected in series. (The fifteenth configuration.)

According to another aspect of the present invention, a transformer includes a primary magnetic core, a secondary magnetic core, at least one primary winding wound around the primary magnetic core, and a plurality of secondary windings wound around the secondary magnetic core. Moreover, the primary and secondary magnetic cores are arranged so as to face each other via an insulator, and the primary and secondary magnetic cores each have a selectively larger cross-sectional area in its part close to the insulator. (The sixteenth configuration.)

According to another aspect of the present invention, a direct-current power supply device includes a primary circuit in which a direct-current input voltage is input to both ends of at least one bridge composed of a plurality of transistors connected in series and in which an output of the bridge is connected to a primary winding of a transformer; a plurality of secondary circuits having a plurality of smoothing circuits connected to a plurality of secondary windings of the transformer respectively; and an additional circuit with no smoothing circuit like the smoothing circuits in the secondary circuits. Moreover, the plurality of smoothing circuits are connected in series, and a voltage at both its ends is taken as a direct-current output voltage. (The seventieth configuration.)

Advantageous Effects of the Invention

According to the invention disclosed herein, it is possible to provide a direct-current power supply device which can achieve both easy and stable isolation and a high output gain.

DESCRIPTION OF EMBODIMENTS

<A Basic Configuration>

Figure 1:
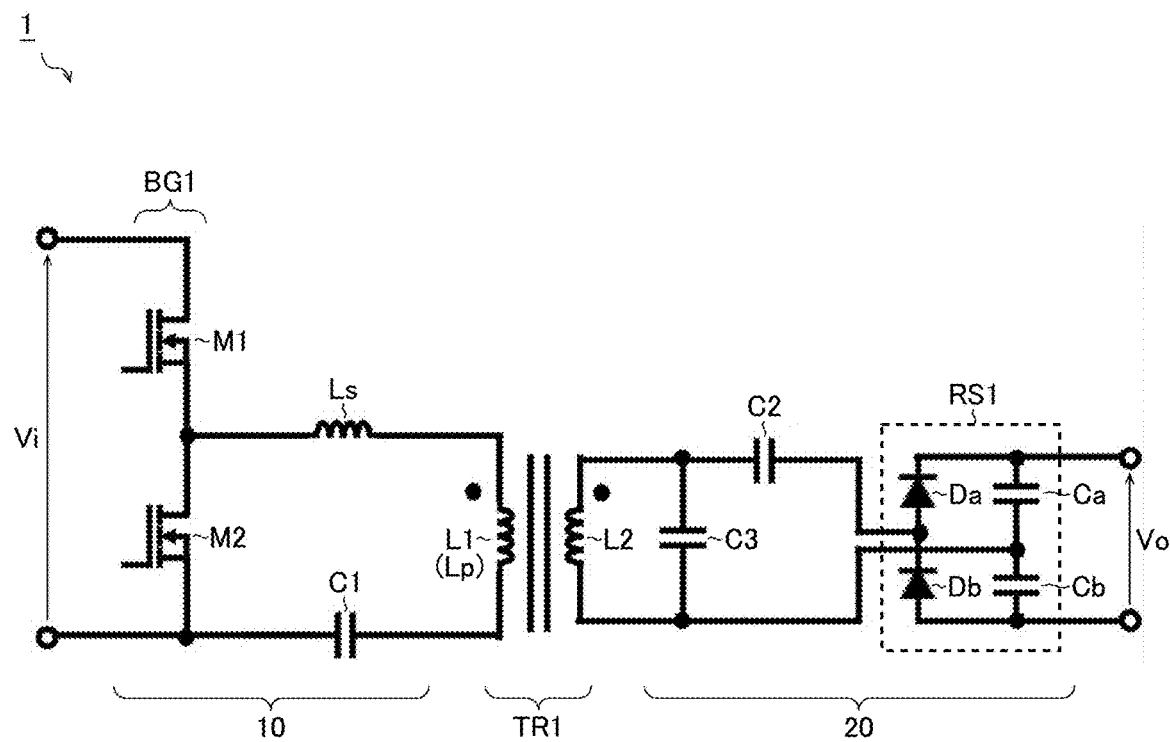
FIG. 1 A circuit diagram showing a basic circuit configuration of a direct-current power supply device.

FIG. 1 is a circuit diagram showing a basic circuit configuration of a direct-current power supply device. The direct-current power supply device 1 of this configuration example is an LLC resonance DC-DC converter which receives a direct-current input voltage Vi and outputs a direct-current output voltage Vo. The direct-current power supply device 1 includes a transformer TR1, a primary circuit 10, and a secondary circuit 20.

The transformer TR1 includes a primary winding L1 and a secondary winding L2 which are magnetically coupled together. The transformer TR1, while electrically isolating the primary circuit 10 and the secondary circuit 20 from each other, transmits alternating-current electric power from the primary circuit 10 to the secondary circuit 20.

The primary circuit 10 is a power supply circuit connected to the primary winding L1 of the transformer TR1. The primary circuit 10 includes a bridge BG1, which is composed of transistors M1 and M2, and a resonance capacitor C1 (a primary direct-current resonance capacitor), which is connected in series with the primary winding L1.

The bridge BG1 is a switching circuit that converts direct-current electric power to alternating-current electric power by turning on and off the transistors M1 and M2 complementarily and thereby switching the direct-current input voltage Vi. In the present description, the term "complementarily" covers not only operation in which the on/off states of the transistors M1 and M2 are reversed completely but also operation in which a delay is secured in the timing of on/off transition (thereby to leave periods in which the transistors are both off).

The secondary circuit 20 is a power receiving circuit connected to the secondary winding L2 of the transformer TR1 and includes a rectifying and smoothing circuit RS1 and a resonance capacitors C2 and C3.

The rectifying and smoothing circuit RS1 is a voltage doubler circuit including rectifying diodes Da and Db and smoothing capacitors Ca and Cb. The rectifying and smoothing circuit RS1 generates a desired direct-current output voltage Vo by rectifying and smoothing alternating-current electric power fed from the primary circuit 10 to the secondary circuit 20 via the transformer TR1. The rectifying and smoothing circuit RS1 does not necessarily need to be a voltage doubler circuit so long as it provides rectifying and smoothing effects.

With the direct-current power supply device 1 of this configuration example, similarly as with a common LLC resonance DC-DC converter, the direct-current output voltage Vo can be adjusted as desired by controlling the operating frequency of the transistors M1 and M2. The LLC resonance operation itself is well-known technology, and thus no description will be given here.

The direct-current power supply device 1 of this configuration example includes, as circuit elements involved in its LLC resonance operation, in addition to resonance reactors Lp and Ls (for example, corresponding to the primary excitation inductance and the leakage inductance of the transformer TR1) and the resonance capacitor C1, resonance capacitors C2 and C3. The resonance capacitor C2 is a secondary series resonance capacitor that couples with the leakage inductance of the transformer TR1. The resonance capacitor C3 is a secondary parallel resonance capacitor that couples with the secondary excitation inductance of the transformer TR1.

With this configuration, in the gain curve (FIG. 2) of the direct-current power supply device 1, a peak of the output gain appears not only at the resonance frequency f1 of the resonance capacitor C1 and the transformer TR1, but also at an operating frequency f2 close to the resonance frequency of the resonance capacitors C2 and C3 and the transformer TR1.

Figure 2:
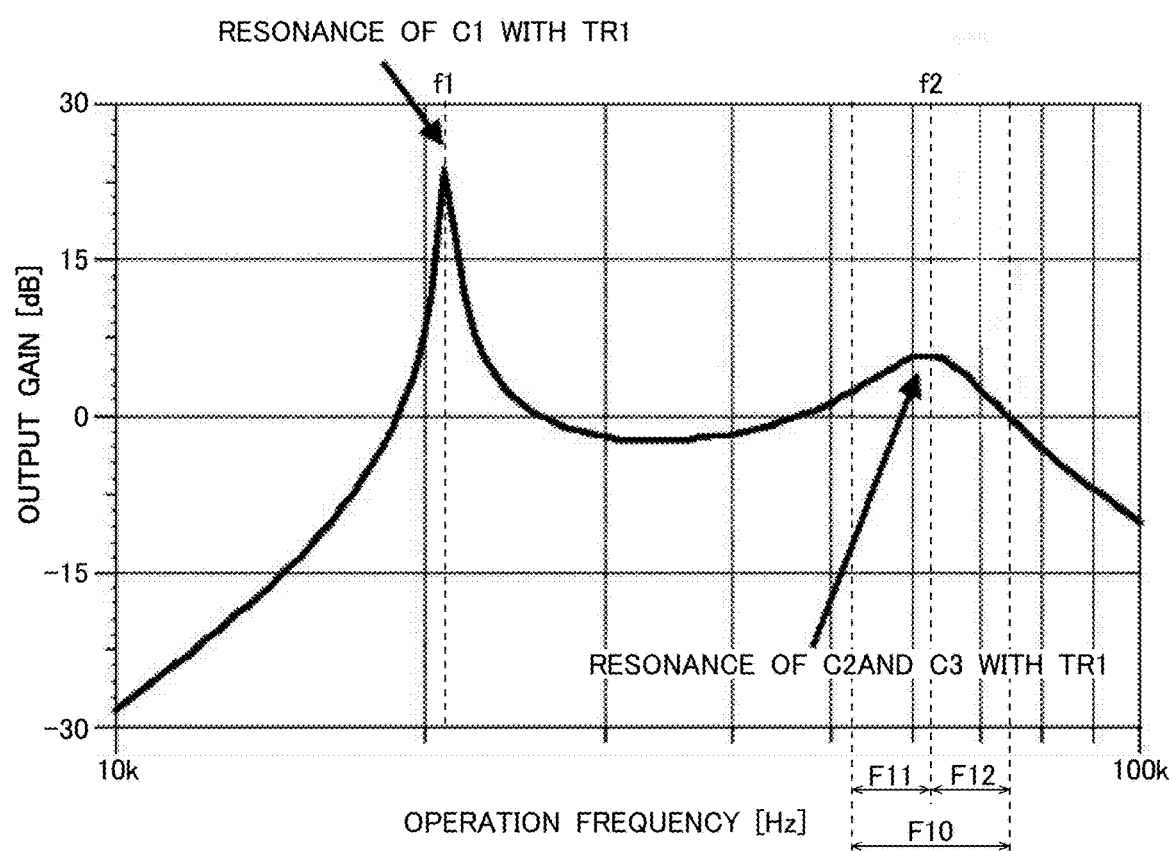
FIG. 2 A diagram showing the relationship between operating frequency and output gain.

Accordingly, as shown in FIG. 2, controlling the operating frequency of the transistors M1 and M2 in a frequency range F10 which is set so as to include the operating frequency f2 makes it possible to achieve a high output gain.

In particular, of the frequency range F10 mentioned above, a lower frequency range F11 lower than the operating frequency f2 is where the output gain changes comparatively gently with respect to the operating frequency and, in addition, the variation of the gain according to the load is small. Thus, by controlling the operating frequency of the transistors M1 and M2 in the lower frequency range F11, it is possible to obtain stable output regardless of load variation.

On the other hand, of the frequency range F10 mentioned above, a higher frequency range F12 higher than the operating frequency f2 is where the output gain changes comparatively sharply with respect to the operating frequency. Thus, by controlling the operating frequency of the transistors M1 and M2 in the higher frequency range F12, it is possible to change the output voltage Vo widely.

Proposed below are various embodiments that, while following the basic configuration (FIG. 1) described above, achieve easy and stable isolation combined with a high output gain.

First Embodiment

Figure 3:
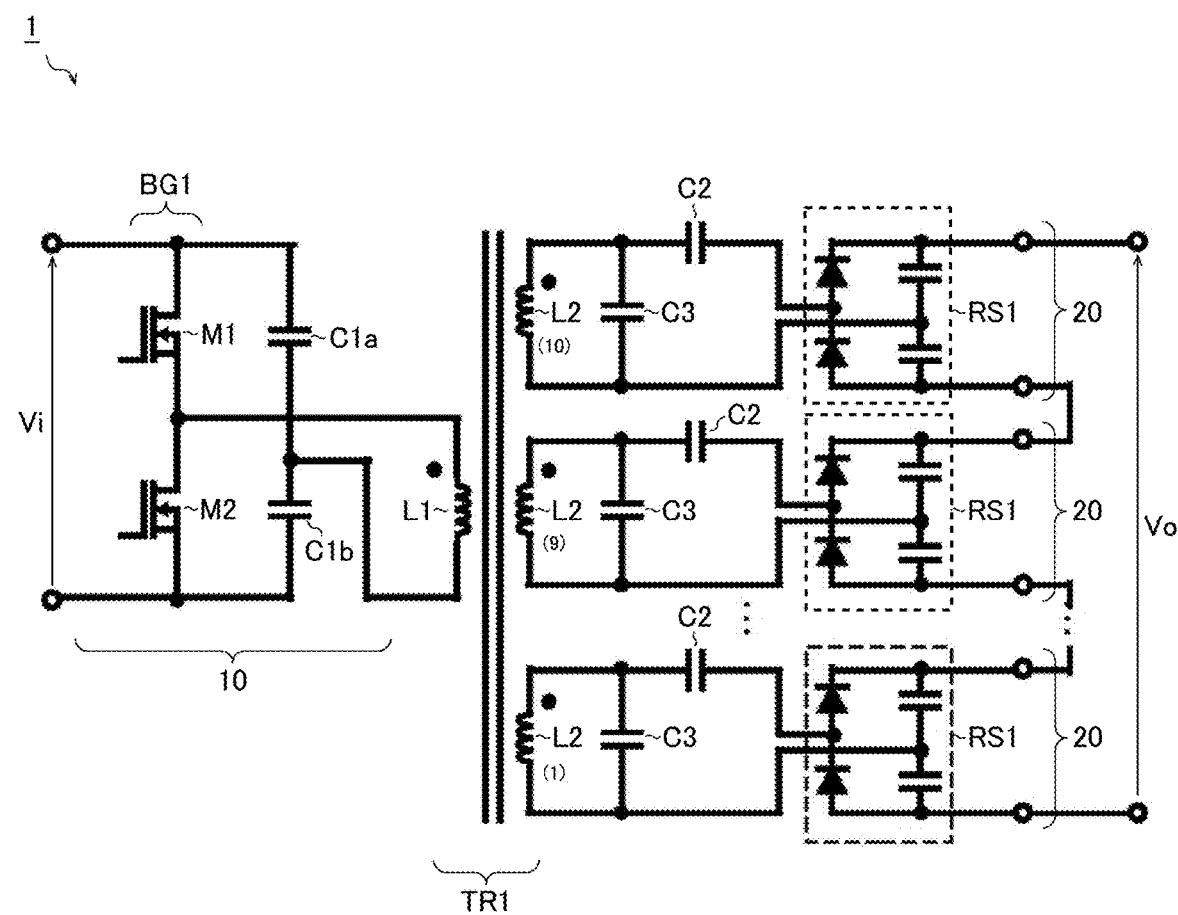
FIG. 3 A circuit diagram of a direct-current power supply device according to a first embodiment.

FIG. 3 is a circuit diagram of a direct-current power supply device according to a first embodiment. The direct-current power supply device 1 of this embodiment is, while being based on the basic configuration (FIG. 1) described previously, characterized in that a single primary circuit 10 is coupled with a plurality of secondary circuits 20. Accordingly, such circuit elements as are similar to those in the basic configuration previously mentioned are identified by the same reference signs as in FIG. 1, and no overlapping description will be repeated. The following description focuses on features unique to this embodiment.

In the direct-current power supply device 1 of this embodiment, a transformer TR1 is provided with a plurality of the secondary windings L2, to which the plurality of secondary circuits 20 are connected respectively. These secondary circuits 20 have the output parts of their respective smoothing circuits RS1 connected in series with each other.

With this configuration, unlike the basic configuration (FIG. 1) in which the primary circuit 10 and the secondary circuit 20 are coupled one-to-one with each other, the output voltage of each stage can be lowered by increasing only the number of series stages in the secondary circuit 20 without increasing stages in the primary circuit 10. Accordingly, there is no need to use a super-high-withstand-voltage diode or capacitor for the secondary smoothing circuit RS1, and it is thus possible to avoid increases in the size and the cost of the circuit.

Incidentally, if the direct-current power supply device 1 is intended for high power, it is preferable to use as the transistors M1 and M2 constituting the bridge BG1, instead of Si-based IGBTs or MOSFETs, SiC-based MISFETs which have a higher withstand voltage (for example, a withstand voltage of 900 V to 1200 V) and which are capable of high-frequency operation. By employing such a configuration, even if the direct-current input voltage Vi is high, the transistors M1 and M2 can be driven at a high-frequency. Thus the transformer TR1 does not need to be made larger than required, and it is thereby possible to reduce the cost, size, and weight of the device and to facilitate maintenance.

In the direct-current power supply device 1 of this embodiment, each of the secondary circuits 20 is provided not only with a smoothing circuit RS1 but additionally with resonance capacitors C2 and C3. The technical significance of inserting these, which has been mentioned in brief in connection with the basic configuration (FIG. 1), will now be described again in detail with reference to FIGS. 4 and 5.

Figure 4:
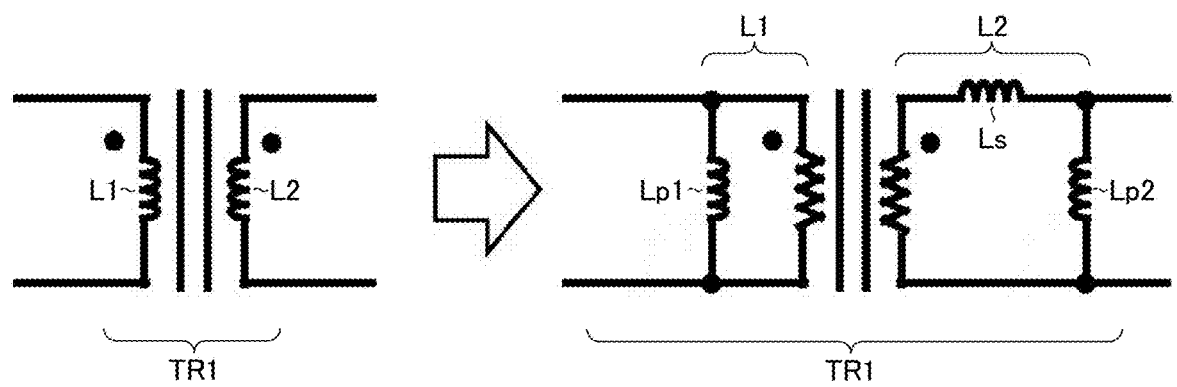
FIG. 4 An equivalent circuit diagram of a transformer.
Figure 5:
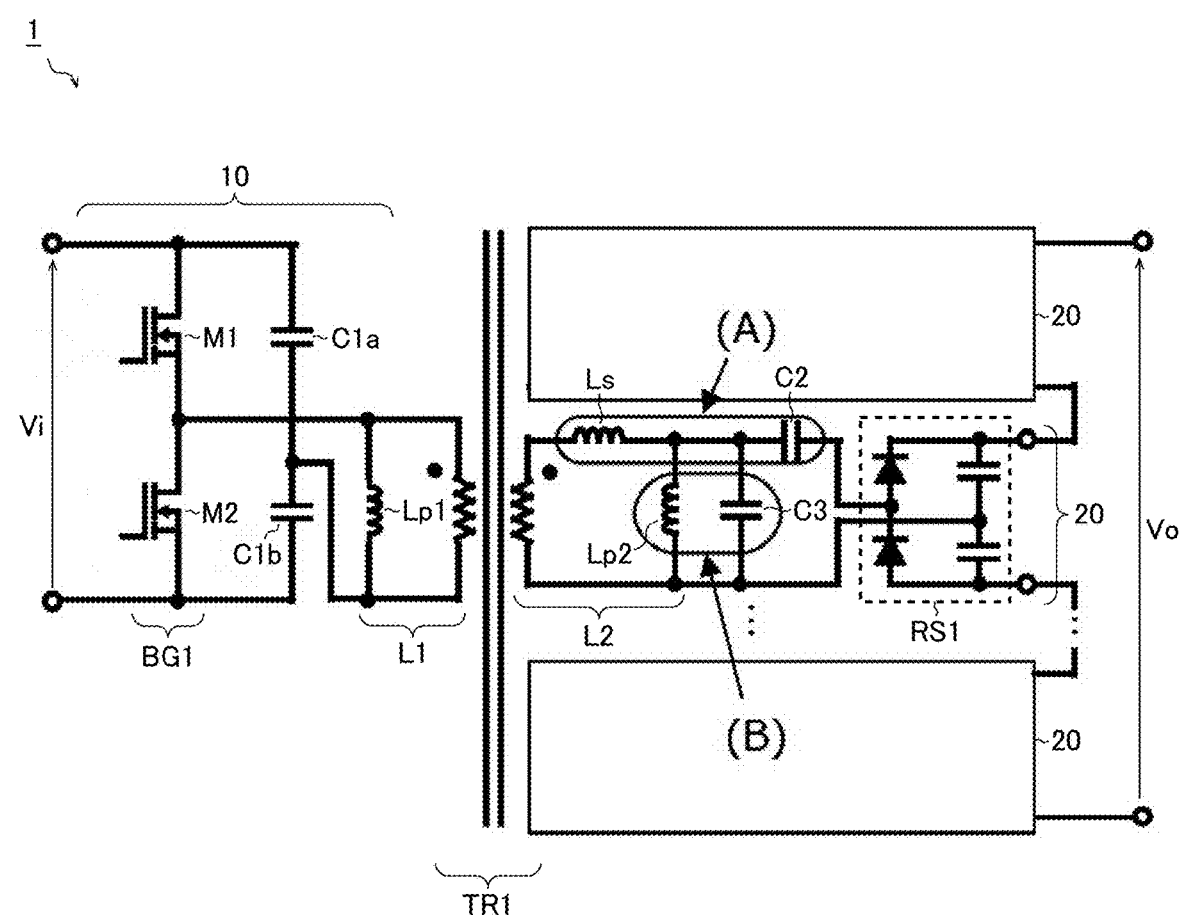
FIG. 5 A circuit diagram illustrating the resonance operation of a secondary circuit.

FIG. 4 is an equivalent circuit diagram (it type) of the transformer TR1. FIG. 5 is a circuit diagram for illustrating the resonance operation of the secondary circuit 20 and corresponds to a combination of FIGS. 3 and 4. As shown in these diagrams, considered in equivalent terms, the transformer TR1 includes a primary excitation inductance Lp1, a secondary excitation inductance LP2, and, in addition to these, a leakage inductance Ls.

Here, the resonance capacitor C2, as indicated by an ellipse (A) in FIG. 5, couples with the leakage inductance Ls of the transformer TR1. Accordingly, as seen from the output side of the secondary circuit 20, the impedance of the LC coupling in the ellipse (A) lowers around their resonance frequency.

On the other hand, the resonance capacitor C3 is, as indicated by an ellipse (B) in FIG. 5, couples with the secondary excitation inductance Lp2 of the transformer TR1. Accordingly, as seen from the output side of the secondary circuit 20, the impedance of the LC coupling in the ellipse (B) rises around their resonance frequency.

Owing to the resonance operation mentioned above, in the gain curve of the direct-current power supply device 1, as shown in FIG. 2 referred to previously, a peak of the output gain appears not only at the resonance frequency f1 of the resonance capacitor C1 (corresponding to the sum of the resonance capacitors C1*a* and C1*b* in this embodiment) and the transformer TR1 but also at an operating frequency f2 close to the resonance frequency of the resonance capacitors C2 and C3 and the transformer TR1.

Accordingly, controlling the operating frequency of the transistors M1 and M2 in the frequency range F10 which is set so as to include the operating frequency f2 makes it possible to achieve a high output gain. In this regard, nothing differs from the basic configuration described previously.

Furthermore, in the direct-current power supply device 1 of this embodiment, to accommodate the circuit configuration described above, much ingenuity has been exercised in the structure of the transformer TR1. Thus, a novel structure of the transformer TR1 in this embodiment will now be described in detail.

Figure 6:
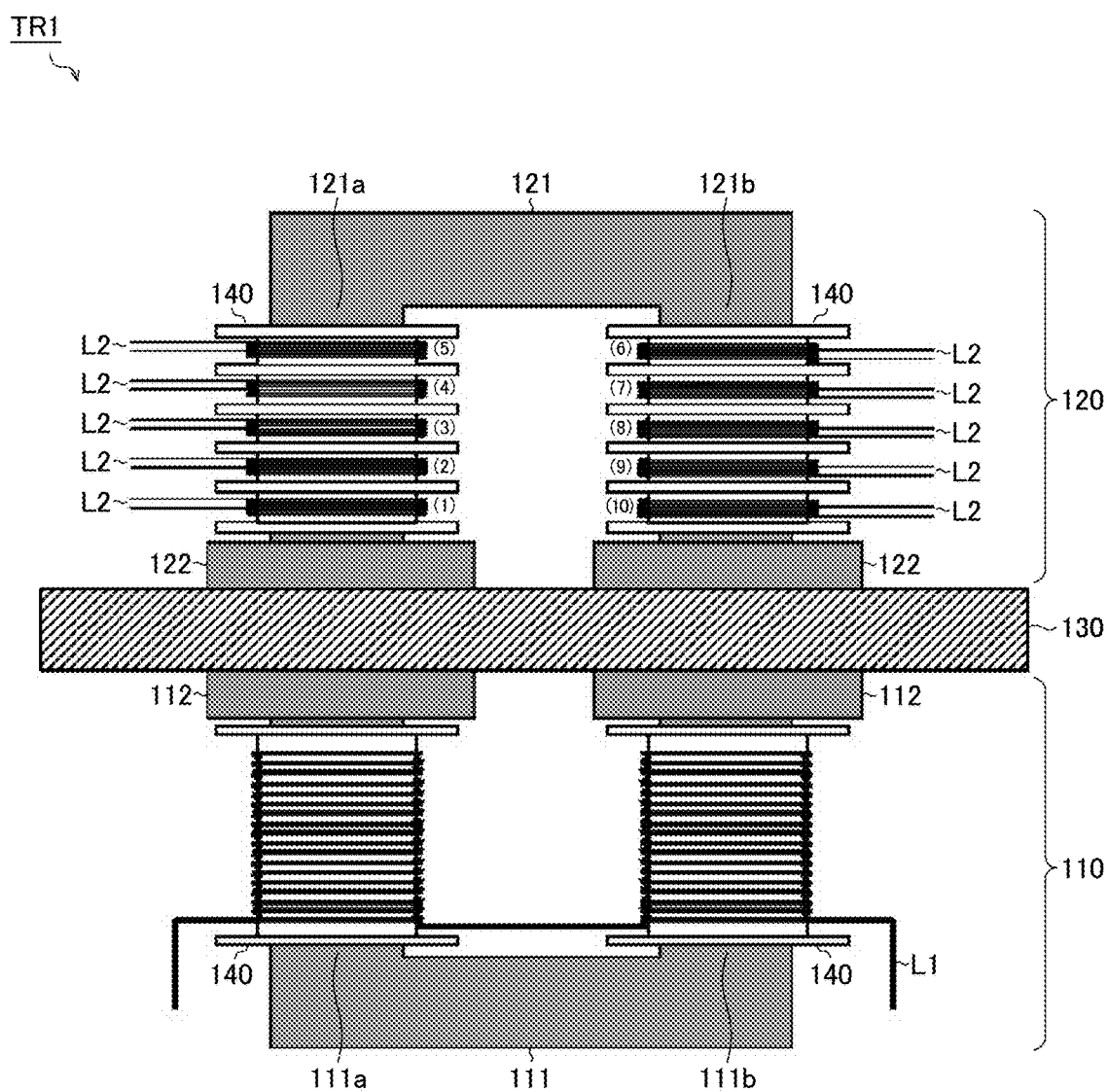
FIG. 6 A schematic front view of one structural example of the transformer according to the first embodiment.
Figure 7:
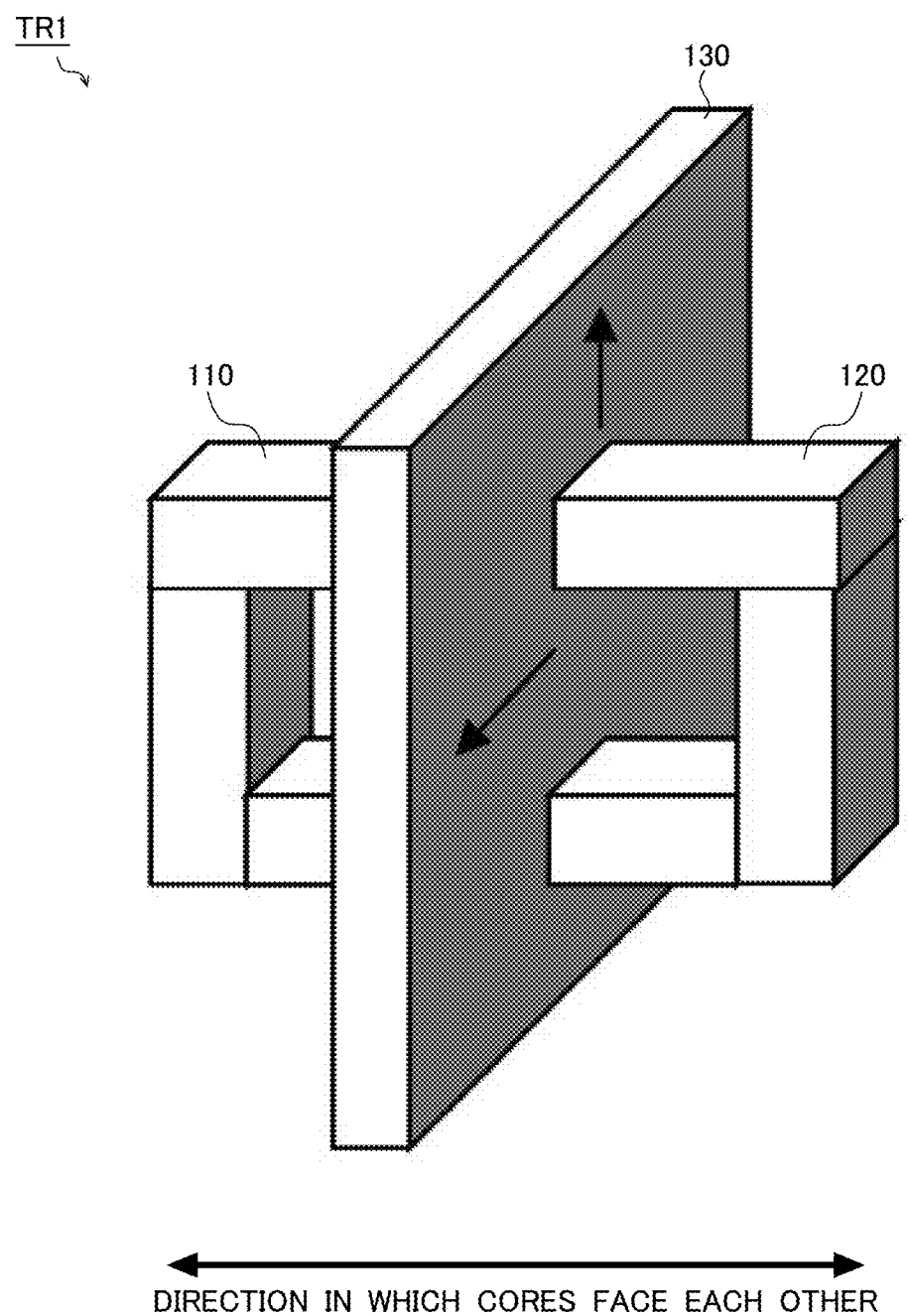
FIG. 7 A schematic perspective view of one structural example of the transformer according to the first embodiment.

FIGS. 6 and 7 are a schematic front view and a perspective view of one structural example of the transformer TR1 according to the first embodiment. The transformer TR1 of this structural example includes a primary magnetic core 110, a secondary magnetic core 120, an insulator 130, and a bobbin 140.

The primary and secondary magnetic cores 110 and 120, combined together, form a closed magnetic circuit, and they are arranged so as to face each other via the insulator 130. The insulator 130 may be arranged so as to make contact with both of the primary and secondary magnetic cores 110 and 120, or may be arranged away from both of them.

With this structure, a sufficient creepage distance or a spatial distance can be secured between the primary magnetic core 110 and the secondary magnetic core 120. It is thus possible, without using oil, which may degrade with time, or special greenhouse effect gas, to secure a sufficient insulation withstand voltage even in the atmosphere.

The insulator 130 is a plate-like member arranged perpendicular to the direction in which the primary magnetic core 110 and the secondary magnetic core 120 face each other. The insulator 130 is designed to be thick enough not to undergo insulation breakdown, and has a larger area than the cross-sectional area of the core. With this structure, the creepage distance between the primary and secondary magnetic cores 110 and 120 can be extended. It is thus possible to suppress discharge between the two cores and degradation of the insulator 130 itself, and thereby to achieve a stable insulation withstand voltage.

In the transformer TR1 of this structural example, the primary and secondary magnetic cores 110 and 120 each have a selectively larger cross-sectional area in a part of it close to the insulator 130. With this structure, it is possible to catch the magnetic flux that leaks into the air and to increase the amount of magnetic flux which can be passed between the primary and secondary magnetic cores 110 and 120. Accordingly, even if the distance between the primary and secondary magnetic cores 110 and 120 is larger due to the insertion of the insulator 130, it is possible to prevent a decrease in the coupling ratio or an increase in the leakage inductance, and thereby to maintain a high output gain.

In particular, in the transformer TR1 of this structural example, the primary and secondary magnetic cores 110 and 120 are respectively composed of the combination of U-shaped first members 111 and 121, around which the primary winding L1 and the secondary winding L2 are wound, and second members 112 and 122, which have larger cross-sectional areas than the first members 111 and 121. The second member 112 is fitted to the tip ends of a first leg part 111*a* and a second leg part 111*b*, and the second member 122 is fitted to the tip ends of a first leg part 121*a* and a second leg part 121*b*. In the primary and secondary magnetic cores 110 and 120, the second members 112 and 122 are arranged so as to face the insulator 130.

In this way, by separately forming the main body part of the core (that is, the first members 111 and 121) and the end part of the core (that is, the second members 112 and 122) whose cross-sectional area is selectively larger near the insulator 130, it is possible to reduce the manufacturing cost substantially compared to a case where they are integrally formed.

Needless to say, so long as as much magnetic flux as possible can be passed inside the core, the cross-sectional area of the core in its part close to the insulator 130 does not necessarily need to be the largest. Any design change in the shape of the core is allowed according to problems in assembly.

In Patent Document 6, an end part of a fixed core (that is, a face facing a movable core) is processed so as to be wider, and apparently this is similar to the structure described above. However, the reason why the end part of the fixed core is wider in Patent Document 6 is to avoid discontinuity between the fixed core and the movable core, and not to achieve the above-mentioned purpose of passing more magnetic flux inside the core. This is obvious from the fact that the end of the movable core (that is, the face facing the fixed core) is not processed so as to be wider.

In the transformer TR1 of this structural example, to the first and second leg parts 111*a* and 111*b* of the primary magnetic core 110, the bobbins 140 are fitted respectively, and the primary winding L1 is wound across both bobbins 140.

Likewise, to the first and second leg parts 121*a* and 121*b* of the secondary magnetic core 120, the bobbins 140 are fitted respectively, and around these a plurality (10 stages in this diagram) of secondary windings L2 are wound. The secondary windings L2 are spatially separated from each other by the bobbin 140. Every two secondary windings L2 (in adjacent stages) of which the outputs are directly connected to each other in the circuit are arranged next to each other.

To describe specifically based on the diagram, around the first leg part 121*a* of the secondary magnetic core 120, from the side close to the insulator 130 (the tip-end side of the first leg part 121*a*) toward the side far from the insulator 130 (the root side of the first leg part 121*a*), the secondary windings L2 of the first to fifth stages are wound in the order named. On the other hand, around the second leg part 121*b* of the secondary magnetic core 120, from the side far from the insulator 130 (the root side of the second leg part 121*b*) toward the side close to the insulator 130 (the tip end side of the second leg part 121*b*), the secondary windings L2 of the sixth to tenth stages are wound in the order named.

With this structure, insulation breakdown is less likely to occur between the secondary windings L2 and their surroundings.

In FIG. 6, for the sake of convenient illustration, the four bobbins 140 are shown to be fitted to the primary and the secondary magnetic cores 110 and 120 respectively. In practice, for example, a single bobbin 140 can be formed such that the primary and the secondary magnetic cores 110 and 120 and the insulator 130 can be fitted to it at their respective predetermined positions so that the bobbin 140 determines the relative positions of those members.

With this structure, it is possible to uniquely determine the relative positions of the primary and secondary magnetic cores 110 and 120 (and hence the relative positions of the first and second members 111 and 112, the relative positions of the first and second members 121 and 122, and the relative positions of the second members 112 and 122), the relative positions of the primary magnetic core 110 and the insulator 130, as well as the relative positions of the secondary magnetic core 120 and the insulator 130. This makes it possible to reduce manufacturing variations in the transformer TR1.

Second Embodiment

Figure 8:
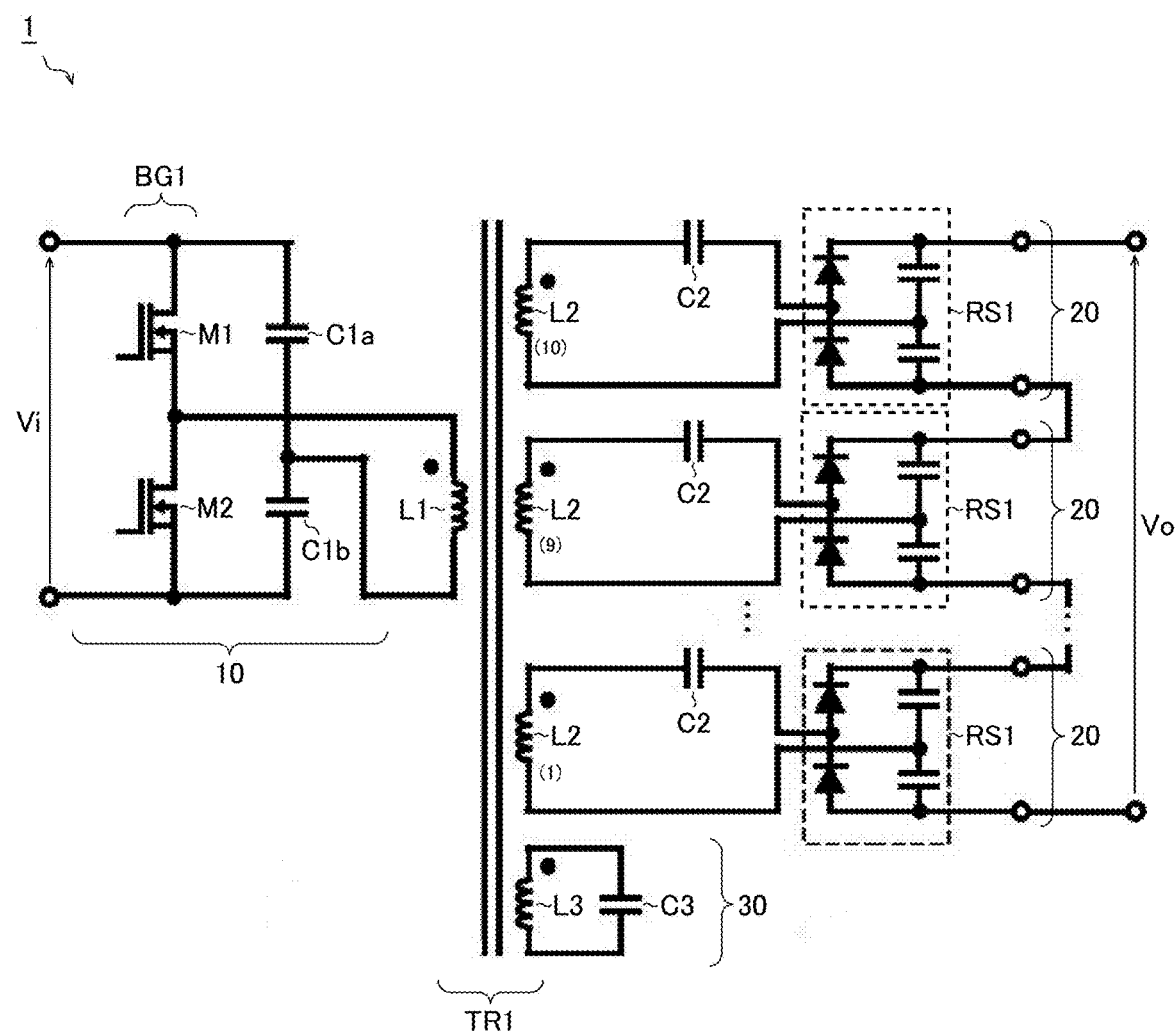
FIG. 8 A circuit diagram of a direct-current power supply device according to a second embodiment.

FIG. 8 is a circuit diagram of a direct-current power supply device according to a second embodiment. The direct-current power supply device 1 of this embodiment is, while being based on the basic configuration (FIG. 3) described previously, characterized in that the resonance capacitor C3 is removed from each of the secondary circuits 20, that an additional winding L3 is provided on the secondary side of the transformer TR1, and that an additional circuit 30 including a resonance capacitor C3 is connected to the additional winding L3. Accordingly, such circuit elements as are similar to those in the first embodiment described previously are identified by the same reference signs as in FIG. 3, and no overlapping description will be repeated. The following description focuses on features unique to this embodiment.

In the direct-current power supply device 1 of this embodiment, controlling the operating frequency of the transistors M1 and M2 in a frequency range near the resonance frequency f3 resulting from the additional winding L3 coupling with the resonance capacitor C3 decreases the impedance of the additional circuit 30, and thus a current passes in the additional circuit 30. As a result, the magnetic flux generated in the core by this current penetrates also other secondary windings L2. Thus, an electromotive current passes through each of the secondary circuits 20 and this makes it possible to obtain a high output gain. Designing the additional circuit 30 such that its circuit elements have a lower parasitic resistance helps suppress power loss in the additional circuit 30, leading to high efficiency.

In the direct-current power supply device 1 of this embodiment, unlike the first embodiment (FIG. 3) described previously, there is no need to provide a resonance capacitor C3 in each of the secondary circuits 20 and this helps reduce the number of components. The operating frequency at which a high output gain can be obtained can be defined with the single additional circuit 30, and this makes it possible to reduce output variations among the different stages in the secondary circuit 20. With this, a uniform design can be adopted for securing isolation among the secondary circuits 20.

Furthermore, in the direct-current power supply device 1 of this embodiment, to accommodate the circuit configuration described above, much ingenuity has been exercised in the structure of the transformer TR1. Thus, a novel structure of the transformer TR1 in this embodiment will now be described in detail.

Figure 9:
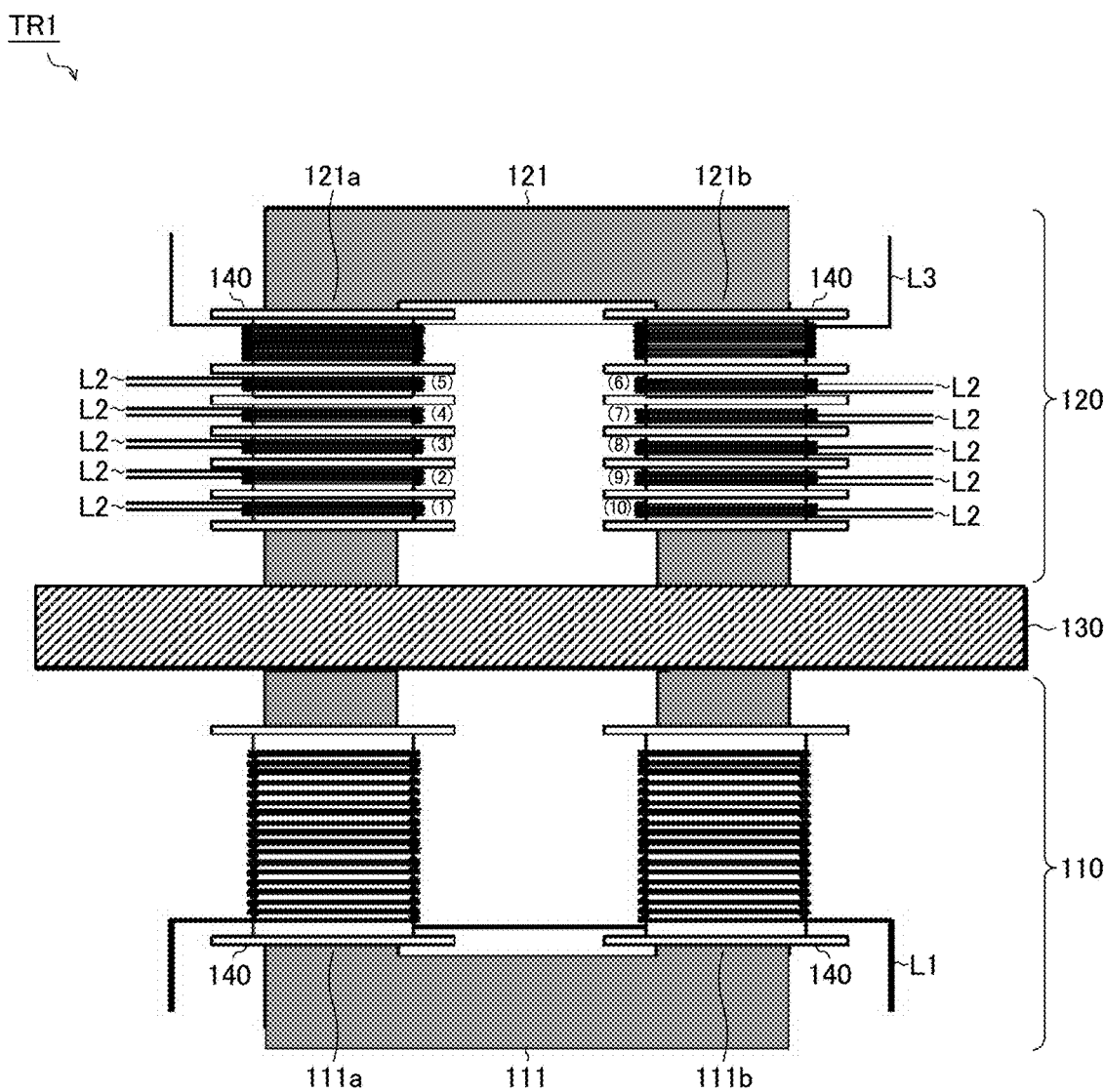
FIG. 9 A schematic front view of a first structural example of a transformer according to the second embodiment.

FIG. 9 is a schematic front view of a first structural example of the transformer TR1 according to the second embodiment. The transformer TR1 of this structural example, while being based on the first embodiment (FIG. 4) described previously, is characterized in that an additional winding L3 is wound around each of the first and second leg parts 121a and 121b of the secondary magnetic core 120. Accordingly, such circuit elements as are similar to those in the first embodiment previously mentioned are identified by the same reference signs as in FIG. 4, and no overlapping description will be repeated. The following description focuses on features unique to this embodiment.

As shown in FIG. 9, the additional winding L3 is arranged between, of the plurality of secondary windings L2, adjacent stages (here, between the fifth and sixth stages) of which the outputs are directly connected to each other in the circuit. With this structure, the potential difference between the additional winding L3 and the secondary windings L2 close to it can be reduced, and this makes it possible to reduce the risk of insulation breakdown.

In particular, if the secondary winding L2 of each stage is wound in the order illustrated, it is preferable to arrange the additional winding L3 between the fifth and sixth stages. With this structure, the additional winding L3 can be wound across both the root parts of the first and second leg parts. Accordingly, compared to the structure in which the additional winding L3 is wound around either of the leg parts, the winding width can be reduced to half.

However, the position for winding the additional winding L3 is not necessarily limited to the one mentioned above. It is also possible to start winding the secondary winding L2 of the first stage from the position farthest from the insulator 130 such that the fifth and sixth stages are arranged on the insulator 130 side, and to wind the additional winding L3 so as to make it close to the insulator 130. Or, the additional winding L3 may be arranged between any other stages which are adjacent to each other, or so as to be adjacent to the secondary winding L2 of the topmost stage (the tenth stage) (that is, in the top end part of the second leg part 121b), or so as to be adjacent to the bottommost stage (the first stage) of the secondary winding L2 (that is, in the top end part of the first leg part 121a).

Figure 10:
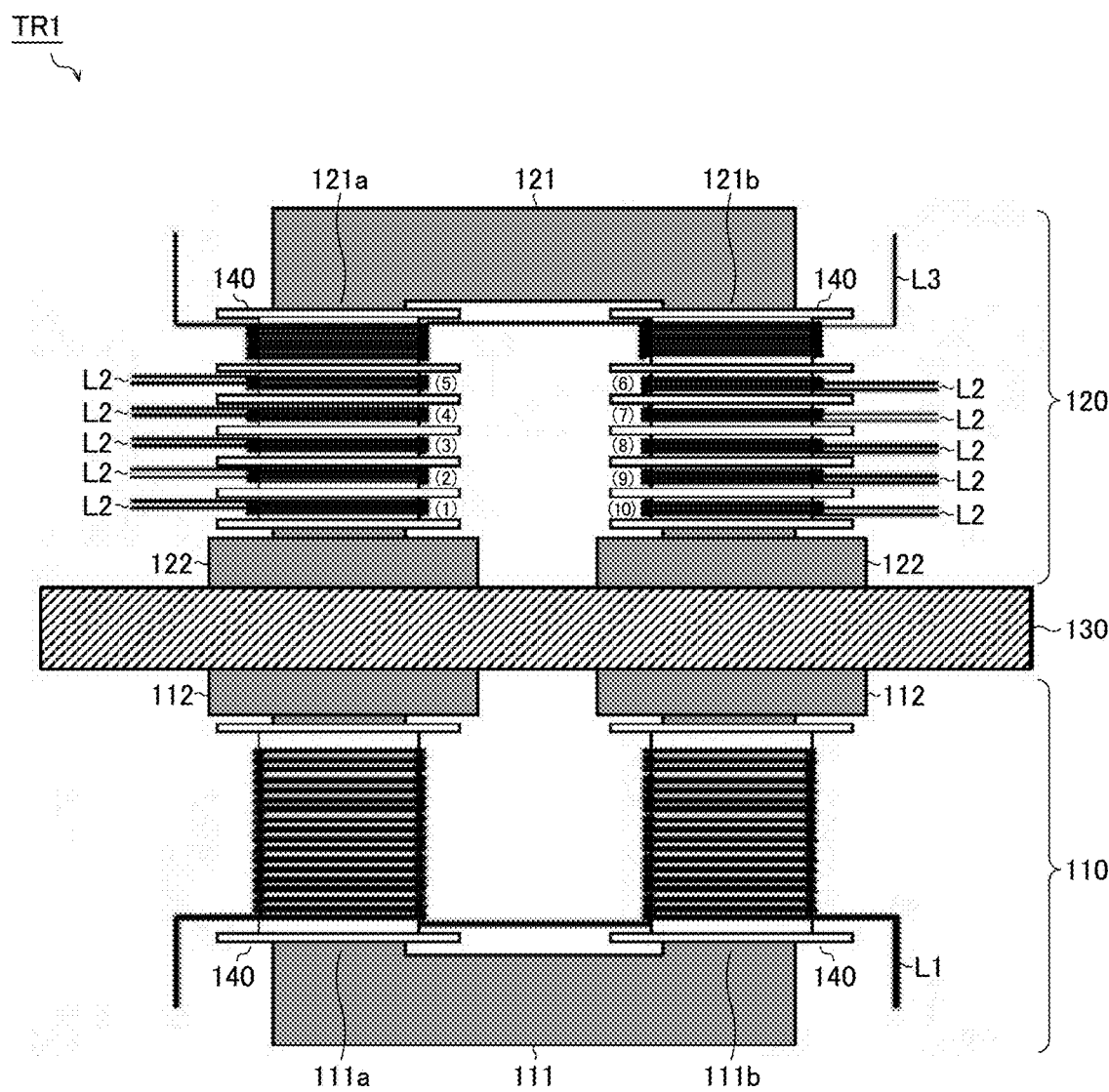
FIG. 10 A schematic front view of a second structural example of the transformer according to the second embodiment.

FIG. 10 is a schematic front view of a second structural example of the transformer TR1 according to the second embodiment. The transformer TR1 of this structural example, while being based on the first structural example (FIG. 9) described previously, is characterized in that the second members 112 and 122 described previously are additionally provided. With this structure, a similar effect to that obtained in the first embodiment (FIG. 6) (that is, an effect of preventing a decrease in the coupling ratio or an increase in the leakage inductance) can be achieved.

Third Embodiment

Figure 11:
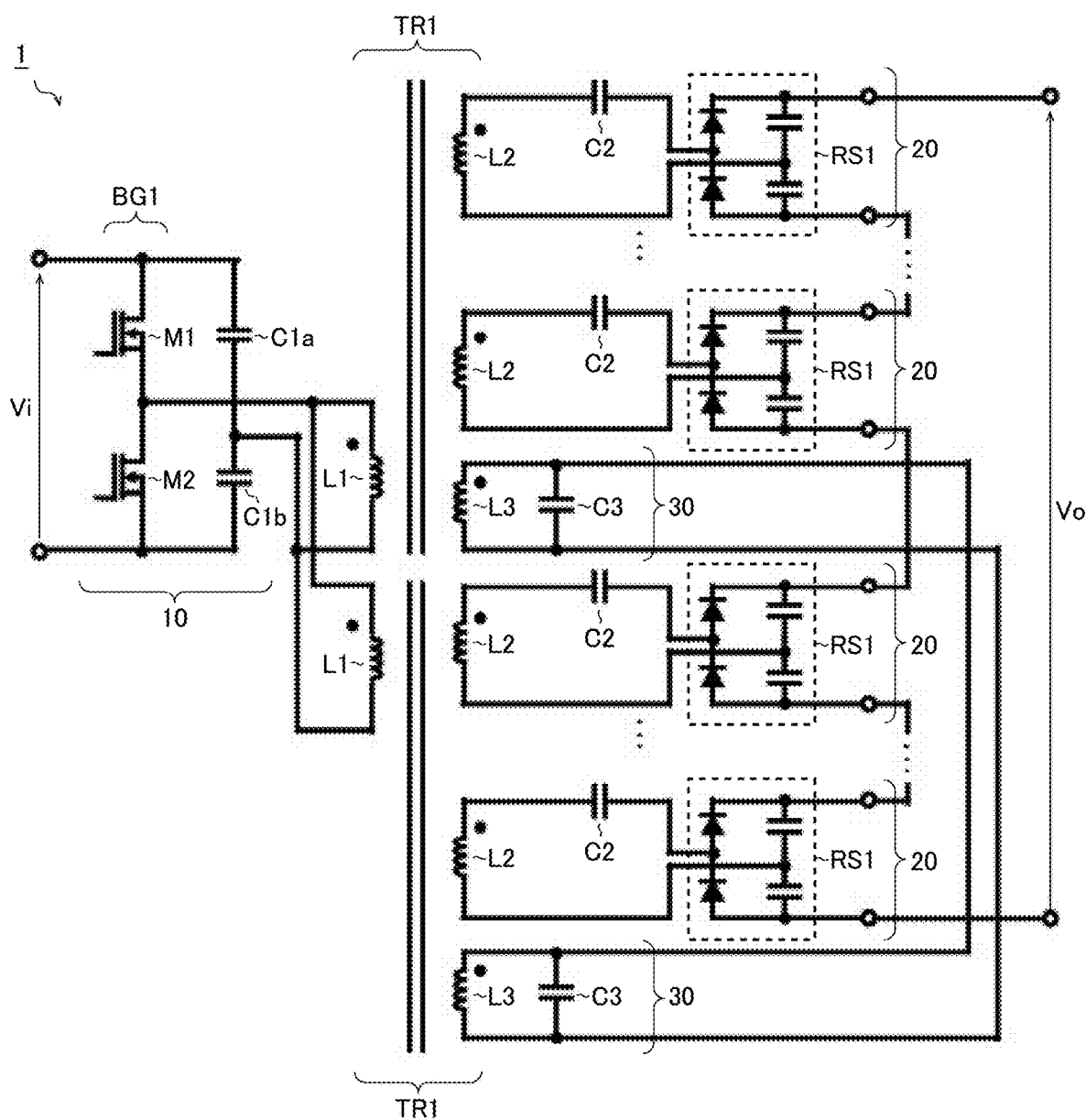
FIG. 11 A circuit diagram of a direct-current power supply device according to a third embodiment.

FIG. 11 is a circuit diagram of a direct-current power supply device according to a third embodiment. The direct-current power supply device 1 of this embodiment, while being based on the second embodiment (FIG. 8) described previously, is characterized in that a plurality of sets (here, two sets) of a transformer TR1, a plurality of secondary circuits 20, and an additional circuit 30 are provided. Accordingly, such circuit elements as are similar to those in the second embodiment described previously are identified by the same reference signs as in FIG. 8, and no overlapping description will be repeated. The following description focuses on features unique to this embodiment.

In the direct-current power supply device 1 of this embodiment, the primary winding L1 included in the transformer TR1 in each set is connected in parallel with a common primary circuit 10. The additional winding L3 included in the transformer TR1 in each set is connected in parallel with the one in the other set. The plurality of secondary circuits 20 have the output parts of their respective smoothing circuits RS1 connected in series across all the sets.

With this circuit configuration, for a single primary circuit 10, an output voltage can be obtained from a larger number of secondary circuits 20 connected in series, and thus it is possible to output a high voltage while suppressing the number of elements.

Figure 12:
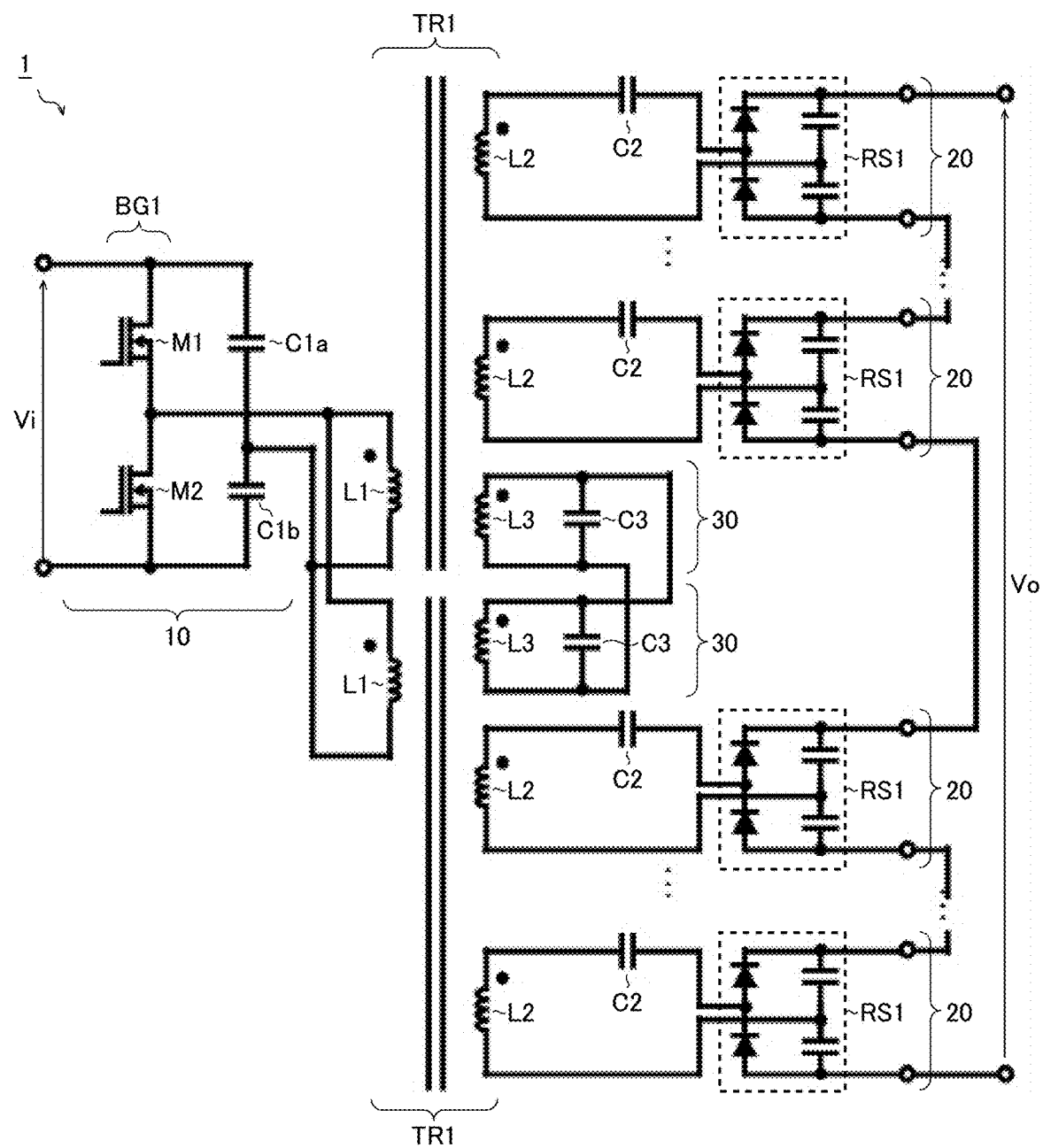
FIG. 12 A modified example of the circuit diagram of the direct-current power supply device according to the third embodiment.

In the direct-current power supply device 1 of this embodiment, the primary circuit 10 needs to be operated at the same operation frequency for a plurality of secondary circuits 20. On the other hand, the additional winding L3 of each set is connected in parallel with the one of the other set, and thus the additional circuits 30 of the two set form a synthetic additional circuit. As a result, the resonance frequency resulting from the additional winding L3 in each set coupling with the synthetic additional circuit is shared among the plurality of the secondary circuits 20, and thus it is possible to reduce output voltage variations caused by a deviation in the resonance frequency. Accordingly, it is possible to prevent the output voltage of the secondary circuit 20 from exceeding the rated voltage and damaging or prematurely degrading the elements. This makes it possible to achieve a stable output of the direct-current power supply device 1. If the additional circuits 30 in a plurality of sets are arranged at the same place (the place with the same positional relationship with the secondary circuit 20) across all the sets, it is possible to standardize the structure of the transformer, and thus it is possible to standardize the voltage dividing balance among the sets, to reduce the designing and manufacturing cost, and to facilitate maintenance. As shown in FIG. 12, in a modified example of the direct-current power supply device of the third embodiment, the additional circuits 30 in the two sets that are connected in series are provided respectively at a place adjacent to the topmost stage on the low-potential side and at a place adjacent to the bottommost stage on the high-potential side. This structure makes it easier to secure isolation of the additional circuits 30 that are connected in parallel from circuits peripheral to them.

Fourth Embodiment

Figure 13:
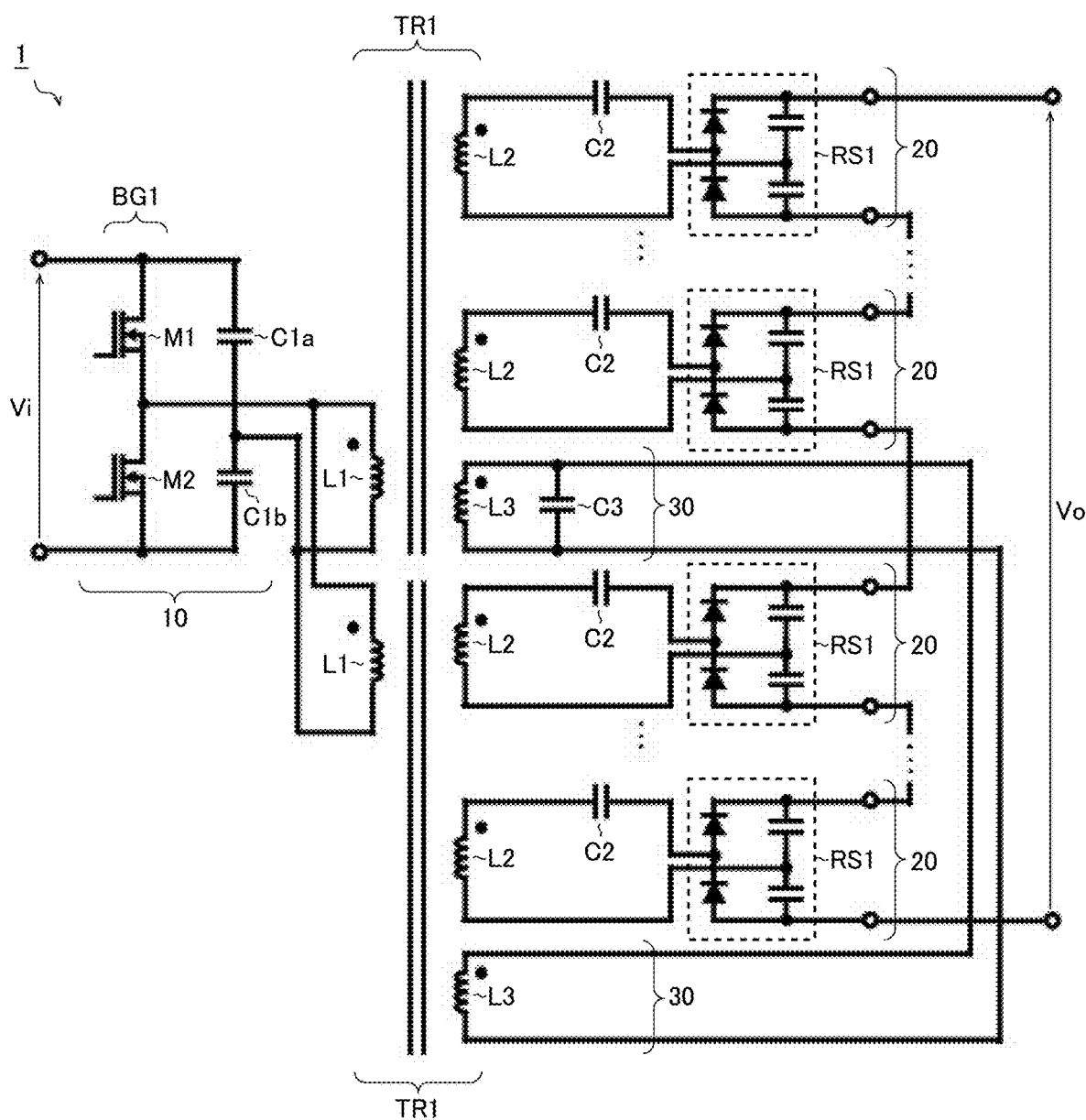
FIG. 13 A circuit diagram of a direct-current power supply device according to a fourth embodiment.
Figure 14:
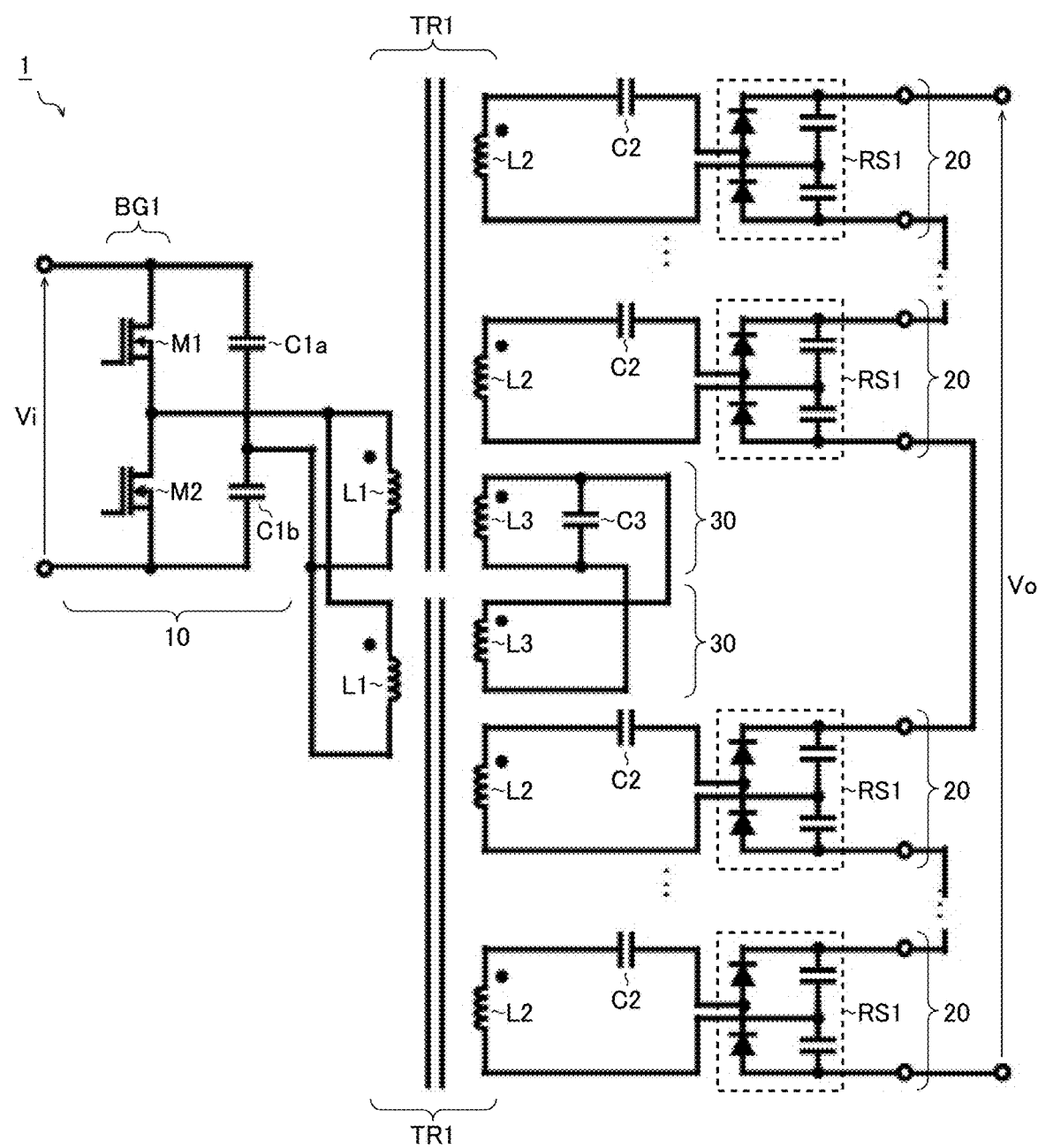
FIG. 14 A modified example of the circuit diagram of the direct-current power supply device according to the fourth embodiment.

FIGS. 13 and 14 are circuit diagrams of a direct-current power supply device according to a fourth embodiment and its modified example. The direct-current power supply device 1 of this embodiment, while being based on the third embodiment (FIG. 11) described previously, is characterized in that at least one resonance capacitor C3 is shared among the additional circuits 30 in a plurality of sets. With this configuration, it is possible to achieve a similar effect to that obtained in the third embodiment described previously while preventing resonance between resonance capacitors C3 and thereby stabilizing the output as well as reducing the number of components.

Fifth Embodiment

Figure 15:
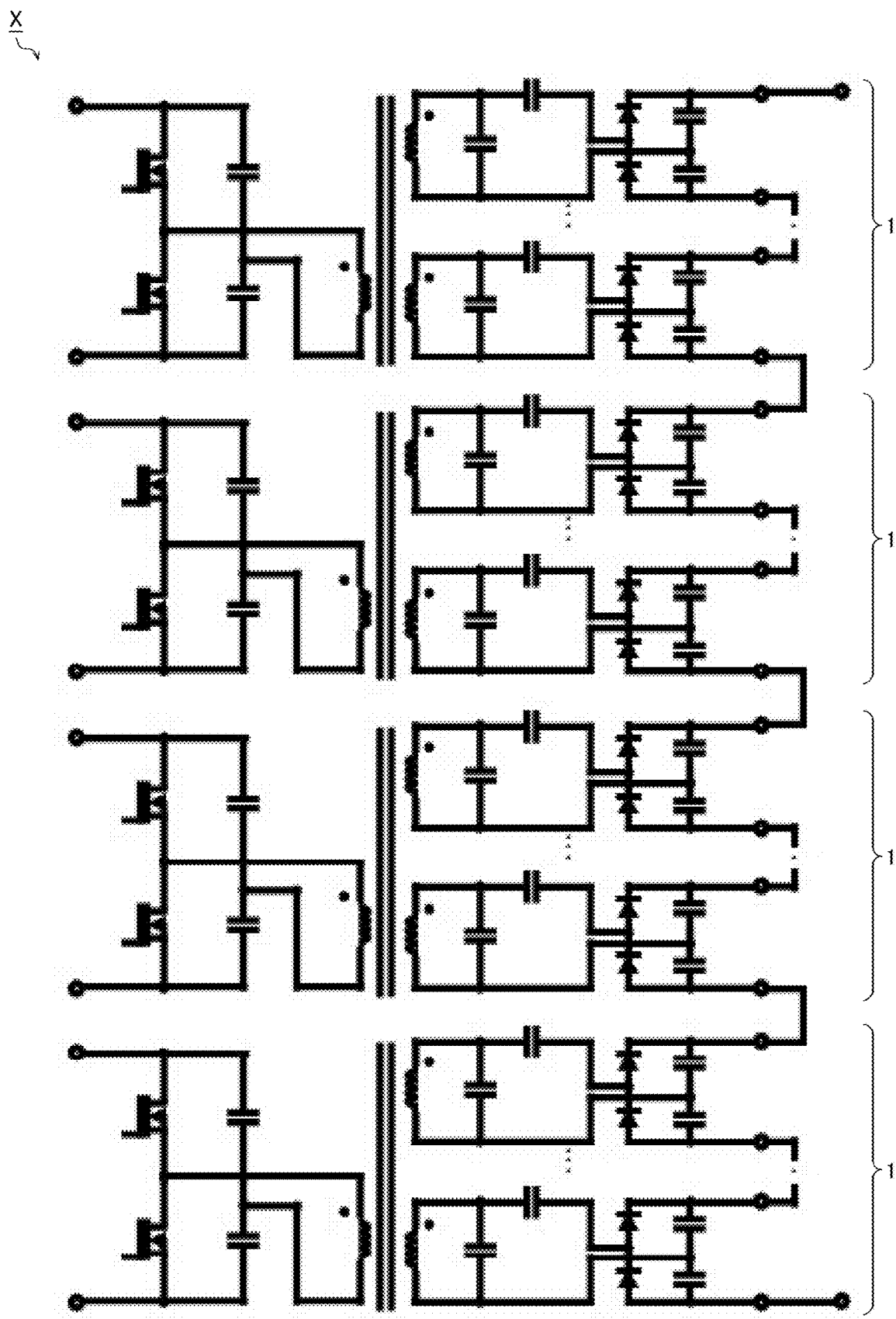
FIG. 15 A circuit diagram of a direct-current power supply device according to a fifth embodiment.

FIG. 15 is a circuit diagram of a direct-current power supply device according to a fifth embodiment (which is a first construction example of a direct-current power supply system). In this embodiment, a direct-current power supply system X which outputs a high voltage is constructed using a plurality of direct-current power supply devices 1 according to the first embodiment (FIG. 3).

More specifically, the direct-current power supply system X of this diagram has a plurality of direct-current power supply devices 1 according to the first embodiment, and is constructed by once again connecting the respective output parts in series. In this way, by connecting in series a plurality of direct-current power supply devices 1 having the same isolation specification with each other, compared to a case where a single direct-current power supply device 1 is used, a high voltage as many times as the number of series sets can be obtained. In particular, in each of the direct-current power supply device 1, an even and stable output voltage can be obtained from the secondary circuit 20 of each stage. Accordingly, the output voltage from each direct-current power supply device 1 is stable, and this allows a stable supply of the output voltage from the direct-current power supply system X.

Sixth Embodiment

Figure 16:
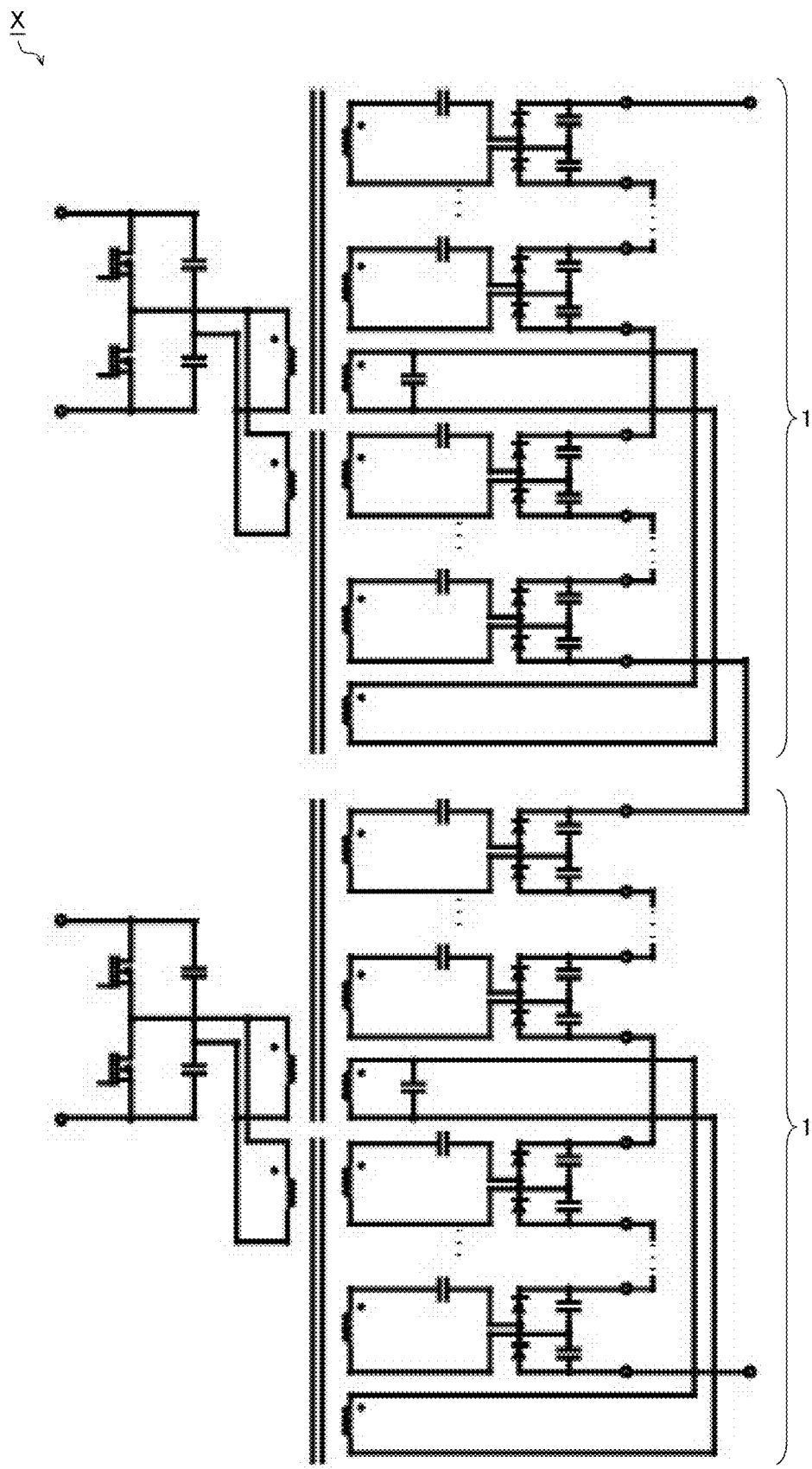
FIG. 16 A circuit diagram of a direct-current power supply device according to a sixth embodiment.

FIG. 16 is a circuit diagram of a direct-current power supply device according to a sixth embodiment (which is a second construction example of the direct-current power supply system). In this embodiment, a direct-current power supply system X is constructed using a plurality of direct-current power supply devices 1 according to the fourth embodiment (FIG. 13). Also in this embodiment, as in the fifth embodiment described previously, a higher output voltage can be obtained compared to a case where a single direct-current power supply device 1 is used.

Seventh Embodiment

Figure 17:
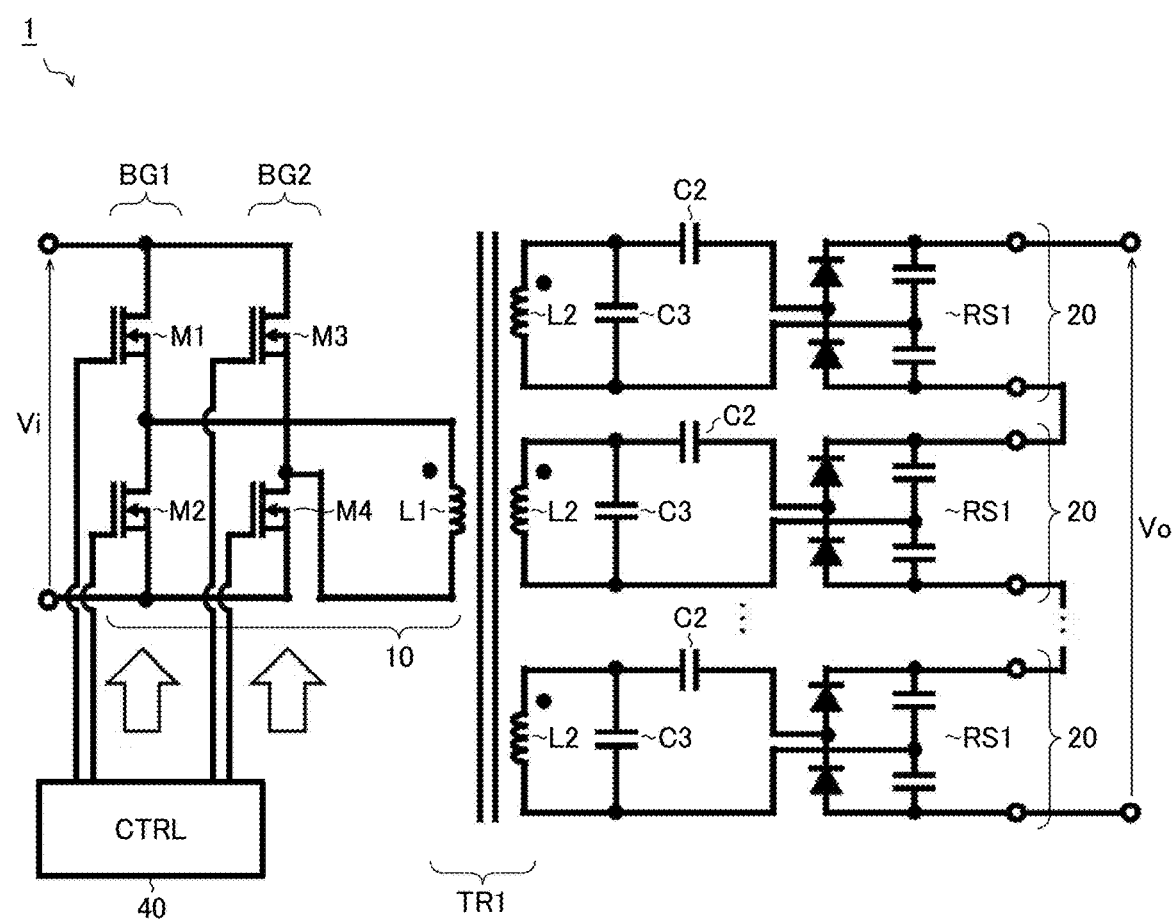
FIG. 17 A circuit diagram of a direct-current power supply device according to a seventh embodiment.

FIG. 17 is a circuit diagram of a direct-current power supply device according to a seventh embodiment. The direct-current power supply device 1 of this embodiment, while being based on the first embodiment (FIG. 3) described previously, is characterized in that it includes, as the bridge in the primary circuit 10, a bridge BG2 composed of the transistors M3 and M4 in addition to the bridge BG1 mentioned previously, and that it, using the control circuit 40, controls individually or in a coordinated manner the operating frequency and the operation phase difference of the transistors M1 to M4 constituting the bridges BG1 and BG2 respectively. Accordingly, such circuit elements as are similar to those in the first embodiment described previously are identified by the same reference signs as in FIG. 3, and no overlapping description will be repeated. The following description focuses on features unique to this embodiment.

Figure 18:
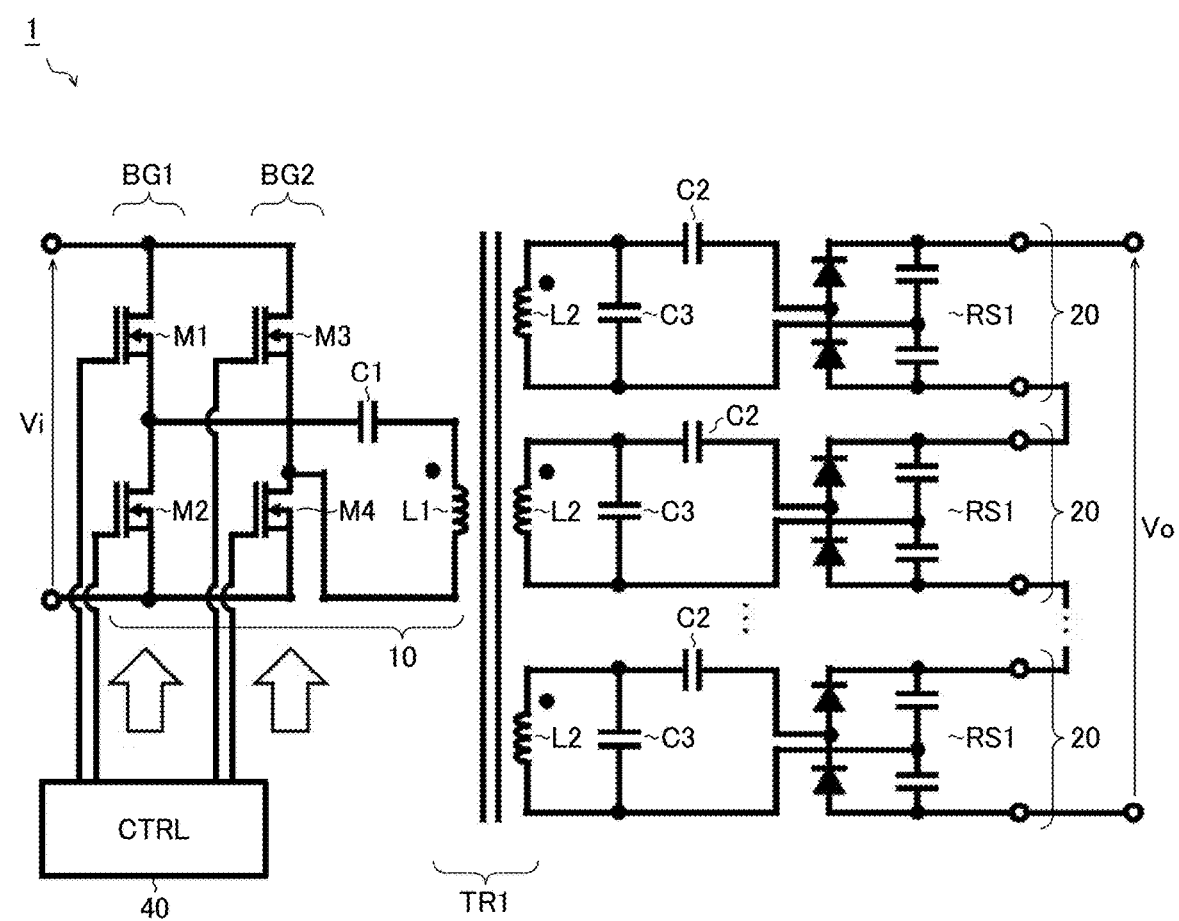
FIG. 18 A modified example of the circuit diagram of the direct-current power supply device according to the seventh embodiment.

In the direct-current power supply device 1 of this embodiment, the primary winding L1 is connected in series between the output terminal of the bridge BG1 (that is, the connection node between the transistors M1 and M2) and the output terminal of the bridge BG2 (that is, the connection node between the transistors M3 and M4). Although no resonance capacitor is included in FIG. 17 since such a full-bridge circuit is operable without a resonance capacitor in the primary circuit 10, also a configuration in which a resonance capacitor C1 is connected in series with the primary winding L1 as shown in FIG. 18 is operable. This makes it possible to cut the direct current which passes in the primary winding L1, and thus to prevent the saturation of the transformer TR1.

Figure 21:
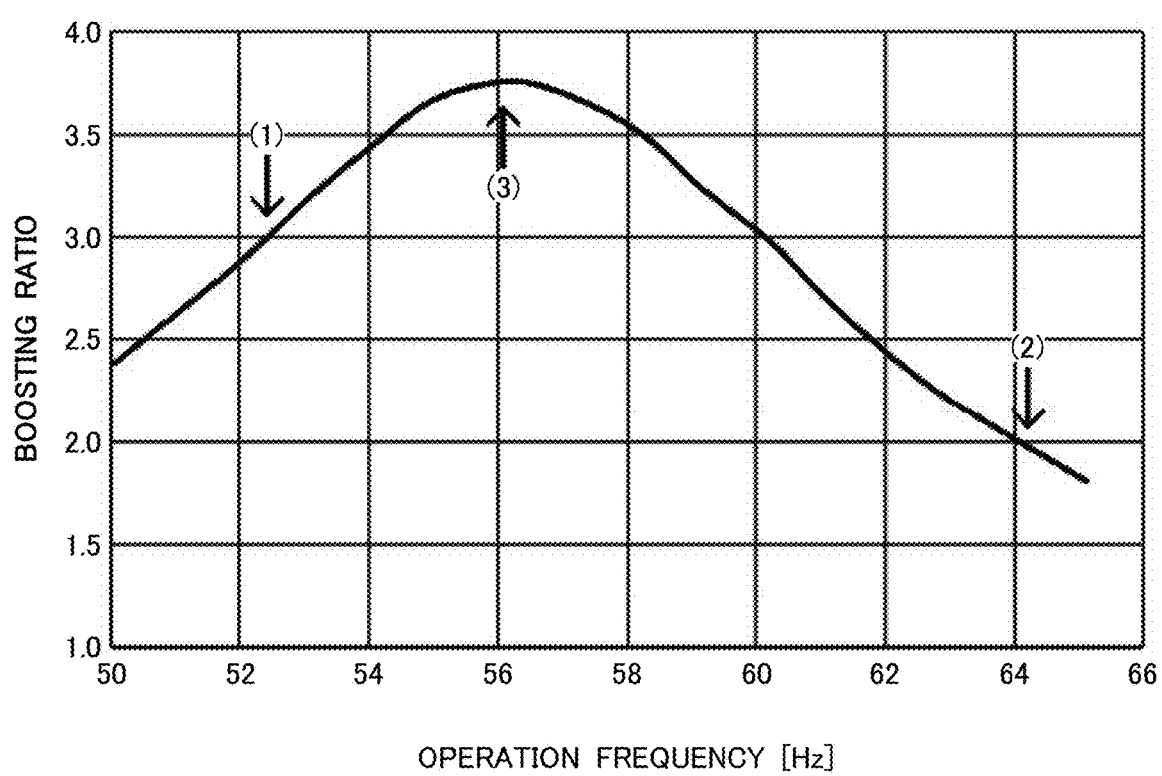
FIG. 21 A diagram showing the relationship between operating frequency and boosting ratio.

As shown in FIG. 21, the change in the boosting ratio (corresponding to the output gain) with respect to the operating frequency of the primary circuit 10 is comparatively sharp. Thus, when only the operating frequency is controlled to adjust the boosting ratio, a slight change in the operating frequency can significantly change the boosting ratio, and thus the adjustment is very difficult.

Figure 22:
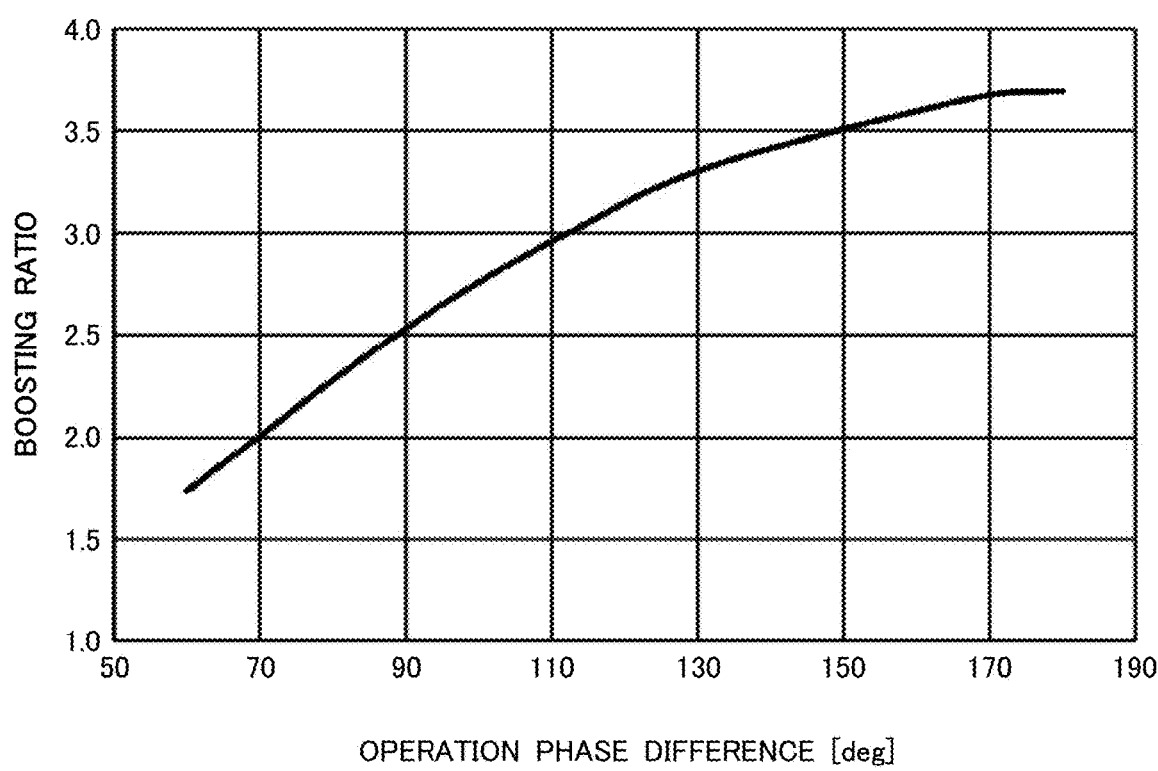
FIG. 22 A diagram showing the relationship between operation phase difference and boosting ratio.
Figure 23:
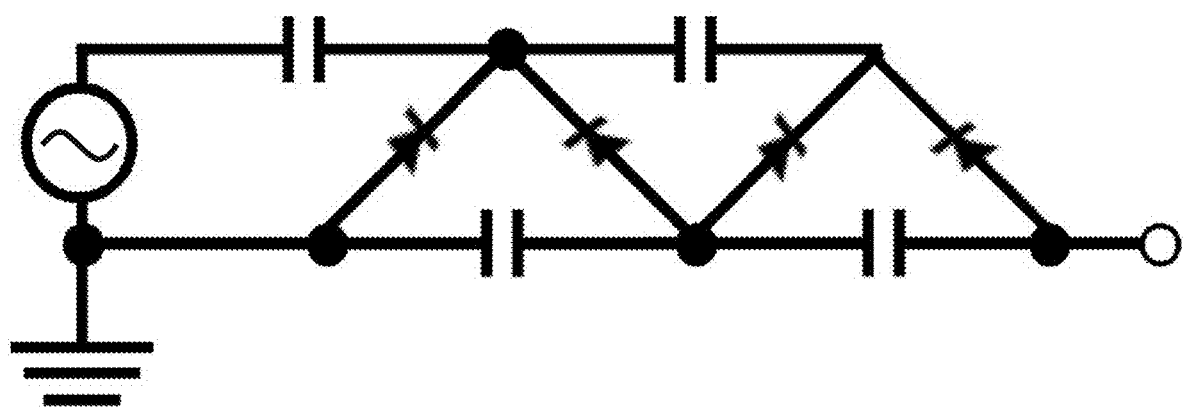
FIG. 23 A diagram showing one configuration example of a two-stage CW circuit.

On the other hand, as shown in FIG. 22, the change in the boosting ratio with respect to the operation phase difference between the bridges BG1 and BG2 is comparatively gentle. It also is a one-direction change in which the boosting ratio rises monotonically as the operation phase difference is increased. Accordingly, by using the control of the operation phase difference in addition to the control of the operating frequency, it is possible to achieve output gain control over a stable, wide range.

For example, in one possible control method, as in a common MPPT (maximum power point tracking) control, first the operating frequency is controlled to find the operating frequency at which the highest output gain can be obtained, and then the operation phase difference is controlled to adjust the output power.

When the resonance frequency of the direct-current power supply device 1 deviates due to the variation of the temperature condition and the positional relationship among the different members (the primary magnetic core 110, the secondary magnetic core 120, and the insulator 130 described previously) which constitute the transformer TR1, it can occur that, as shown in FIG. 21, the operating frequency (3) at which the boosting ratio reaches its peak value appears between the current operating frequency (1) and the operating frequency (2) for obtaining the desired boosting ratio.

Under such circumstances, when the operating frequency is changed continuously from (1) to (2), it rises up to (3) in the course, at which time the boosting ratio reaches its peak value, possibly resulting in problems such as a fault in the secondary circuit 20 or in the load due to unintended high voltage output.

On the other hand, in the direct-current power supply device 1 of this embodiment, output adjustment is possible in which the boosting ratio is first lowered in advance by controlling the operation phase difference, and then the operating frequency is changed from (1) to (2), and finally, the operation phase difference is controlled again to restore the boosting ratio so as to avoid unintended high voltage output.

Eighth Embodiment

Figure 19:
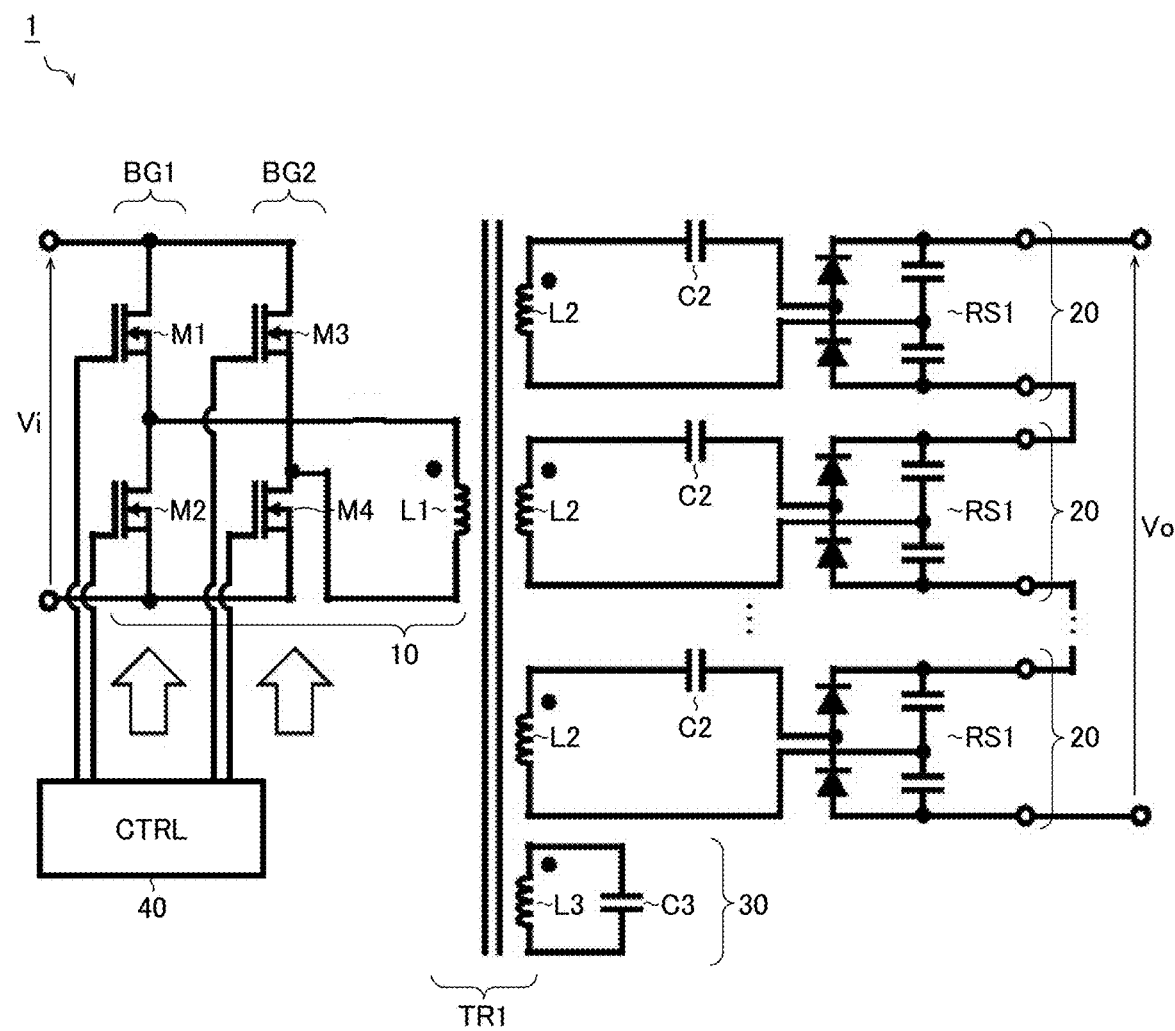
FIG. 19 A circuit diagram of a direct-current power supply device according to an eighth embodiment.
Figure 20:
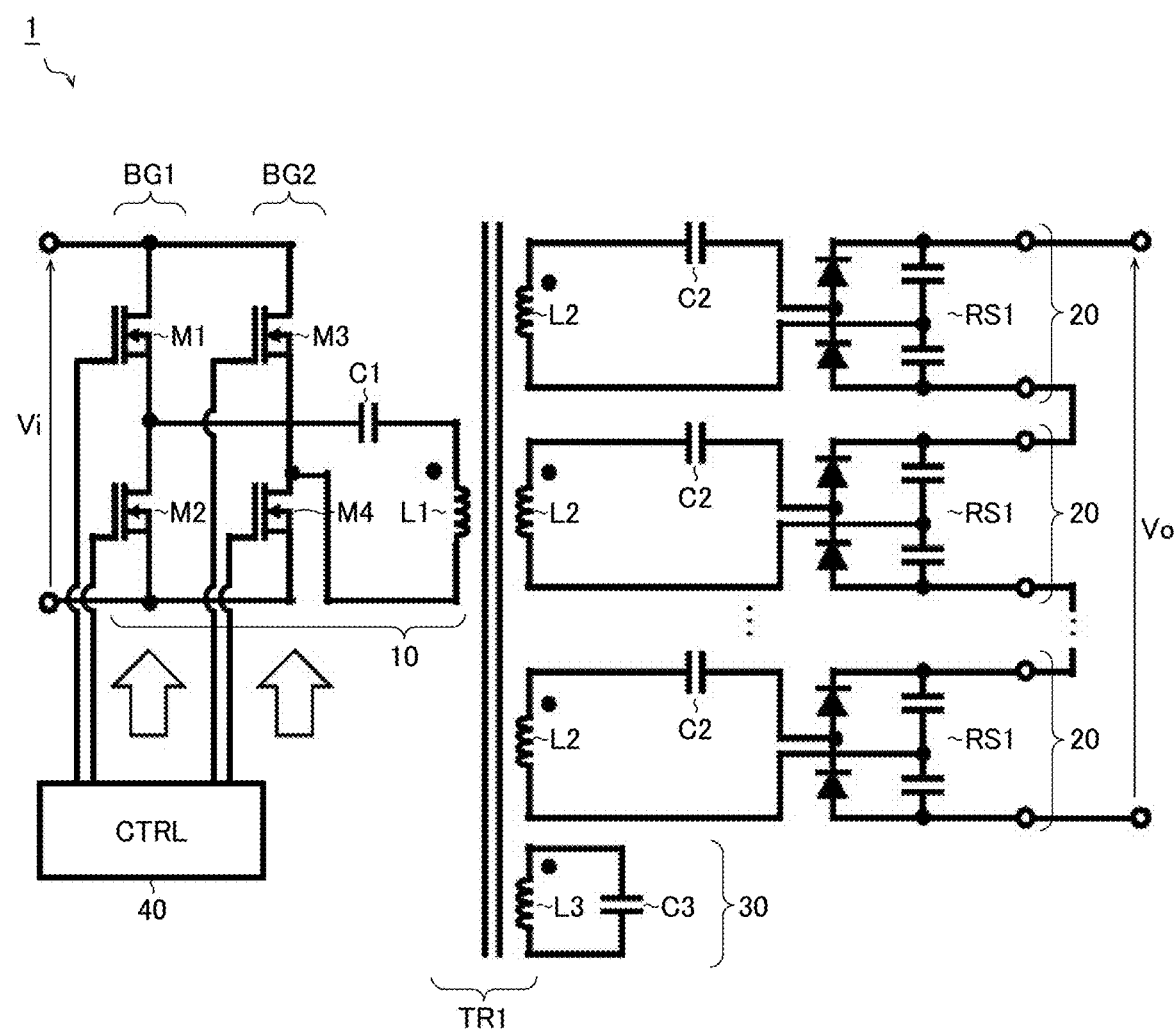
FIG. 20 A modified example of the circuit diagram of the direct-current power supply device according to the eighth embodiment.

FIG. 19 is a circuit diagram of a direct-current power supply device according to an eighth embodiment. The direct-current power supply device 1 of this embodiment, while being based on the second embodiment (FIG. 8) described previously, is characterized in that, as in the seventh embodiment (FIG. 17), it controls individually the operating frequency and the operation phase difference of the transistors M1 to M4 which constitute the bridges BG1 and BG2 respectively. With this configuration, as in the seventh embodiment described previously, it is possible to achieve output gain control over a stable, wide range. Although no resonance capacitor is included in FIG. 19 for the same reason as in FIG. 17, as shown in FIG. 20, also a configuration in which a resonance capacitor C1 is connected in series with the primary winding L1 is operable. This makes it possible to cut the direct-current which passes in the primary winding L1, and thus to prevent the saturation of the transformer TR1.

Other Modified Examples

The various technical features disclosed herein may be implemented in any other manner than in the embodiments described above, and allow for many modifications without departing from the spirit of the present invention. For example, a bipolar transistor and a MOS field-effect transistor may be replaced with each other, and the logical levels of various signals may be inverted. That is, the above embodiments should be understood to be in every aspect illustrative and not restrictive. The scope of the present invention is defined not by the description of the embodiments given above but by the appended claims, and should be understood to encompass any modifications made in the sense and scope equivalent to those of the claims.

INDUSTRIAL APPLICABILITY

The invention disclosed herein finds application in direct-current power supply devices (especially those which deal with a high voltage).

LIST OF REFERENCE SIGNS 1 direct-current power supply device
10 primary circuit
20 secondary circuit
30 additional circuit
40 control circuit
110 primary magnetic core
120 secondary magnetic core
111, 121 first member
111a, 121a first leg part
111b, 121b second leg part
112, 122 second member
130 insulator
140 bobbin
TR1 transformer
L1 primary winding
L2 secondary winding
L3 additional winding
Lp resonance reactor (primary excitation inductance)
Lp1 primary excitation inductance
Lp2 secondary excitation inductance
Ls resonance reactor (leakage inductance)
C1, C1a, C1b resonance capacitor (primary series resonance capacitor)
C2 resonance capacitor (secondary series resonance capacitor)
C3 resonance capacitor (secondary parallel resonance capacitor)
M1, M2, M3, M4 transistor (SiC-MISFET)
BG1, BG2 bridge
RS1 rectifying and smoothing circuit
Da, Db rectifying diode
Ca, Cb smoothing capacitor
X direct-current power supply system

The invention claimed is:
1. A direct-current power supply device comprising:
a transformer including
   a primary magnetic core,
   a secondary magnetic core,
   at least one primary winding wound around the primary magnetic core, and
   a plurality of secondary windings wound around the secondary magnetic core;
a primary circuit including at least one bridge composed of a transistor, the primary circuit being connected to the primary winding; and
a plurality of secondary circuits each including a first secondary resonance capacitor, a second secondary resonance capacitor, and a smoothing circuit, the plurality of secondary circuits being connected to the plurality of secondary windings respectively,
wherein
the transformer electrically isolates the primary circuit from the plurality of secondary circuits,
the plurality of secondary circuits have output parts of respective smoothing circuits thereof connected in series with each other,
the primary and secondary magnetic cores are arranged so as to face each other via an insulator, and the insulator is a plate-like member having a larger area than a cross-sectional area of each of the primary and secondary cores facing the insulator.

2. The direct-current power supply device according to claim 1, wherein
the primary circuit further includes a primary resonance capacitor.

3. The direct-current power supply device according to claim 1, wherein
the transistor is an SiC-based MISFET (metal-insulator-semiconductor field-effect transistor).

4. The direct-current power supply device according to claim 1, wherein
the primary and secondary magnetic cores each have a selectively larger cross-sectional area in a part thereof close to the insulator.

5. The direct-current power supply device according to claim 1, wherein
the insulator is arranged perpendicular to a direction in which the primary and secondary magnetic cores face each other, the insulator being thick enough not to undergo insulation breakdown.

6. The direct-current power supply device according to claim 1, wherein
the plurality of secondary windings are spatially separated from each other by a bobbin and every two secondary windings of which the outputs are directly connected to each other in the circuit are arranged next to each other.

7. The direct-current power supply device according to claim 1, wherein
positions of the primary and secondary magnetic cores relative to each other are fixed by a bobbin.

8. The direct-current power supply device according to claim 1, wherein
an operating frequency of the transistor constituting the bridge is set at close to a frequency of an output gain peak determined by the first secondary resonance capacitor, the second secondary resonance capacitor, and the transformer.

9. The direct-current power supply device according to claim 1, wherein
the primary circuit includes first and second bridges as the bridge,
the primary winding is connected between respective output terminals of the first and second bridges, and
an operating frequency and an operation phase difference of the transistor constituting each bridge can be controlled individually or in a coordinated manner.

10. A direct-current power supply device comprising a plurality of the direct-current power supply devices according to claim 1, wherein the direct-current power supply devices have respective output parts thereof connected in series.

11. The direct-current power supply device according to claim 4, wherein
the primary and secondary magnetic cores are each composed of a combination of a first member, around which the primary and secondary windings are wound respectively, and a second member, which has a larger cross-sectional area than the first member, and
the second member is arranged so as to face the insulator.

12. A direct-current power supply device comprising:
a transformer including
a primary magnetic core,
a secondary magnetic core,
at least one primary winding wound around the primary magnetic core,
a plurality of secondary windings wound around the secondary magnetic core, and
at least one additional winding wound around the secondary magnetic core;
a primary circuit including at least one bridge composed of a transistor, the primary circuit being connected to the primary winding;
a plurality of secondary circuits each including a first secondary resonance capacitor and a smoothing circuit, the plurality of secondary circuits being connected to the plurality of secondary windings respectively; and
an additional circuit including a second secondary resonance capacitor and connected to the additional winding,
wherein
the transformer electrically isolates the primary circuit from the plurality of secondary circuits and the additional circuit,
the plurality of secondary circuits have output parts of respective smoothing circuits thereof connected in series with each other,
the primary and secondary magnetic cores are arranged so as to face each other via an insulator, and
the insulator is a plate-like member having a larger area than a cross-sectional area of each of the primary and secondary cores facing the insulator.

13. The direct-current power supply device according to claim 12, wherein
the additional winding is arranged
between adjacent stages of the plurality of secondary windings of which outputs are directly connected to each other in a circuit or
adjacent to a topmost or bottommost stage of the plurality of secondary windings.

14. The direct-current power supply device according to claim 12, wherein
a plurality of sets of the transformer, the plurality of secondary circuits, and the additional circuit are provided,
the primary windings in all the sets are connected each in parallel with the primary circuit, which is common to all the sets,
the additional windings in all the sets are connected in parallel with each other, and
the plurality of secondary circuits have output parts of respective smoothing circuits thereof connected in series across all the sets.

15. The direct-current power supply device according to claim 14, wherein
the second secondary resonance capacitor is shared by the additional circuits in the plurality of sets.

16. A transformer including
a primary magnetic core,
a secondary magnetic core, at least one primary winding wound around the primary magnetic core, and a plurality of secondary windings wound around the secondary magnetic core, wherein the primary and secondary magnetic cores are arranged so as to face each other via an insulator, the primary and secondary magnetic cores each have a selectively larger cross-sectional area in a part thereof close to the insulator, and the insulator is a plate-like member having a larger area than a cross-sectional area of each of the primary and secondary cores facing the insulator.

* * * * *